United States Patent
Lian et al.

(10) Patent No.: US 9,848,402 B2
(45) Date of Patent: Dec. 19, 2017

(54) METHOD AND DEVICE FOR COLLECTING LOCATION INFORMATION

(71) Applicant: Huawei Technologies Co., Ltd., Shenzhen (CN)

(72) Inventors: Feng Lian, Shenzhen (CN); Bin Chai, Shanghai (CN); Shengyi Qin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/195,635

(22) Filed: Jun. 28, 2016

(65) Prior Publication Data

US 2016/0309442 A1    Oct. 20, 2016

Related U.S. Application Data

(63) Continuation of application No. PCT/CN2014/093025, filed on Dec. 4, 2014.

(30) Foreign Application Priority Data

Dec. 31, 2013 (CN) .......................... 2013 1 0752729

(51) Int. Cl.
*H04W 24/00* (2009.01)
*H04W 64/00* (2009.01)
*H04W 4/02* (2009.01)

(52) U.S. Cl.
CPC ............. *H04W 64/00* (2013.01); *H04W 4/02* (2013.01)

(58) Field of Classification Search
None
See application file for complete search history.

(56) References Cited

U.S. PATENT DOCUMENTS 6,134,448 A   10/2000   Shoji et al.
6,842,620 B2   1/2005   Smith et al.
(Continued)

FOREIGN PATENT DOCUMENTS

CN   1212802 A   3/1999
CN   1518391 A   8/2004
(Continued)

OTHER PUBLICATIONS

"3rd Generation Partnership Project; Technical Specification Group Radio Access Network; Study on WLAN/3GPP radio interworking (Release 12)," 3GPP TR 37.832, V12.0.0, pp. 1-19, 3rd Generation Partnership Project, Valbonne, France (Dec. 2013).
(Continued)

*Primary Examiner* — Suhail Khan
(74) *Attorney, Agent, or Firm* — Leydig, Voit & Mayer, Ltd.

(57) ABSTRACT

Embodiments of the present disclosure provide a method and device for collecting location information. The method includes: sending a location subscription instruction to a user equipment (UE) by using a mobile communication network, where the location subscription instruction includes: instructing the UE to measure a cell detected by the UE; receiving instruction response information reported by the UE, where the instruction response information includes an identity (ID) of the UE, an ID of the cell detected by the UE, and signal strength information of the cell detected by the UE; and acquiring location information of the UE according to the received instruction response information.

20 Claims, 12 Drawing Sheets

(56) References Cited

U.S. PATENT DOCUMENTS

| | | |
|---|---|---|
| 7,546,128 B2 | 6/2009 | Smith et al. |
| 8,515,565 B2 | 8/2013 | Smith et al. |
| 2002/0142768 A1 | 10/2002 | Murata et al. |
| 2004/0185870 A1 | 9/2004 | Matsuda |
| 2005/0227703 A1 | 10/2005 | Cheng |
| 2006/0293046 A1 | 12/2006 | Smith |
| 2008/0081641 A1 | 4/2008 | Smith et al. |
| 2010/0323718 A1 | 12/2010 | Jen |
| 2012/0106370 A1* | 5/2012 | Radulescu ........ H04W 36/0083 370/252 |
| 2012/0244881 A1 | 9/2012 | Konishi |

FOREIGN PATENT DOCUMENTS

| | | |
|---|---|---|
| CN | 1678126 A | 10/2005 |
| CN | 1812623 A | 8/2006 |
| CN | 1856161 A | 11/2006 |
| CN | 1863387 A | 11/2006 |
| CN | 101389118 A | 3/2009 |
| CN | 102196490 A | 9/2011 |
| CN | 102656475 A | 9/2012 |
| CN | 103139902 A | 6/2013 |
| CN | 103354660 A | 10/2013 |
| CN | 103369668 A | 10/2013 |
| CN | 103475997 A | 12/2013 |
| CN | 103747522 A | 4/2014 |

OTHER PUBLICATIONS

"3$^{rd}$ Generation Partnership Project; Technical Specification Group Radio Access Network; Study on WLAN/3GPP radio interworking (Release 12)," 3GPP TR 37.834 V12.0.0, pp. 1-19, 3$^{rd}$ Generation Partnership Project, Valbonne, France (Dec. 2013).

* cited by examiner

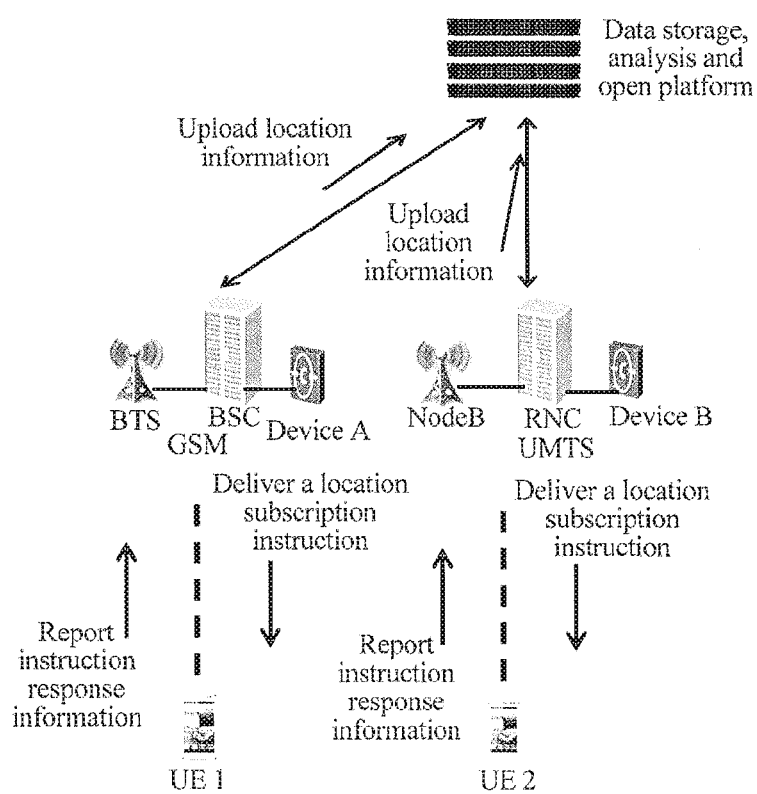
FIG. 11-a

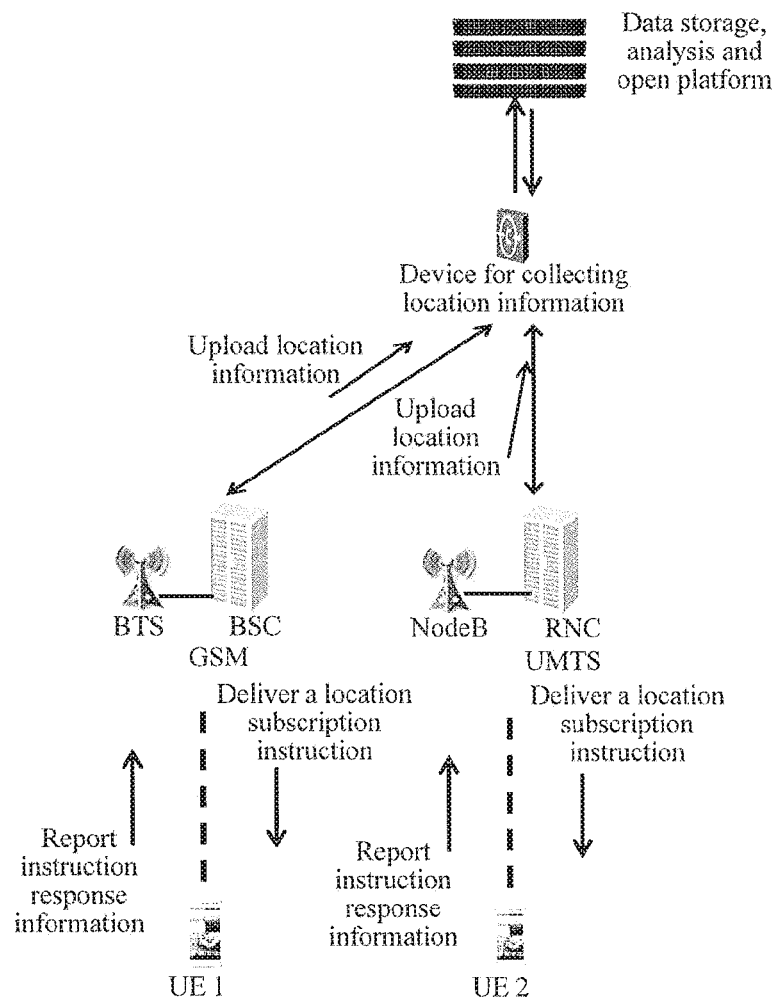
FIG. 11-b

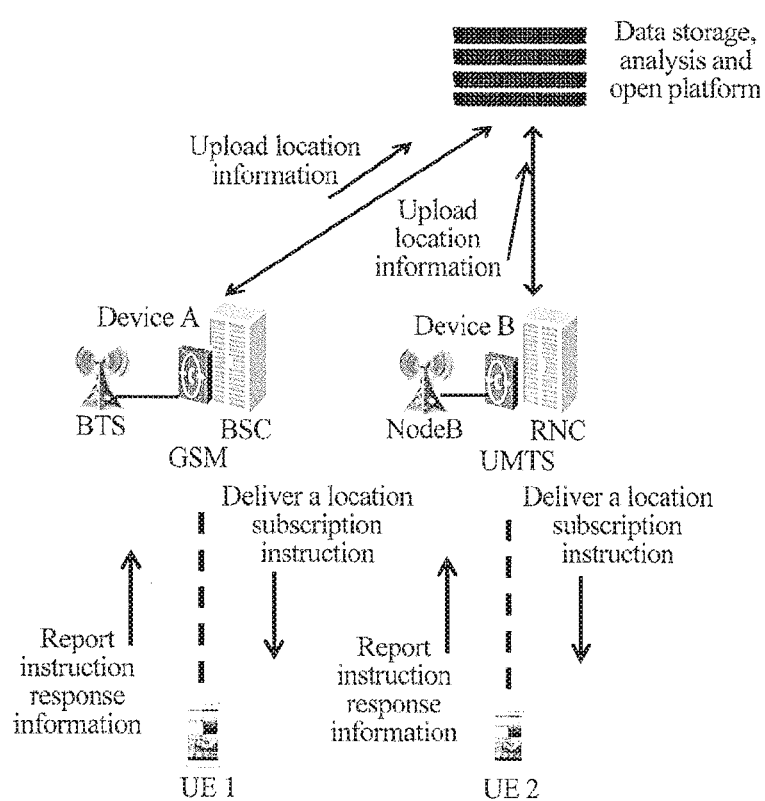
FIG. 11-c

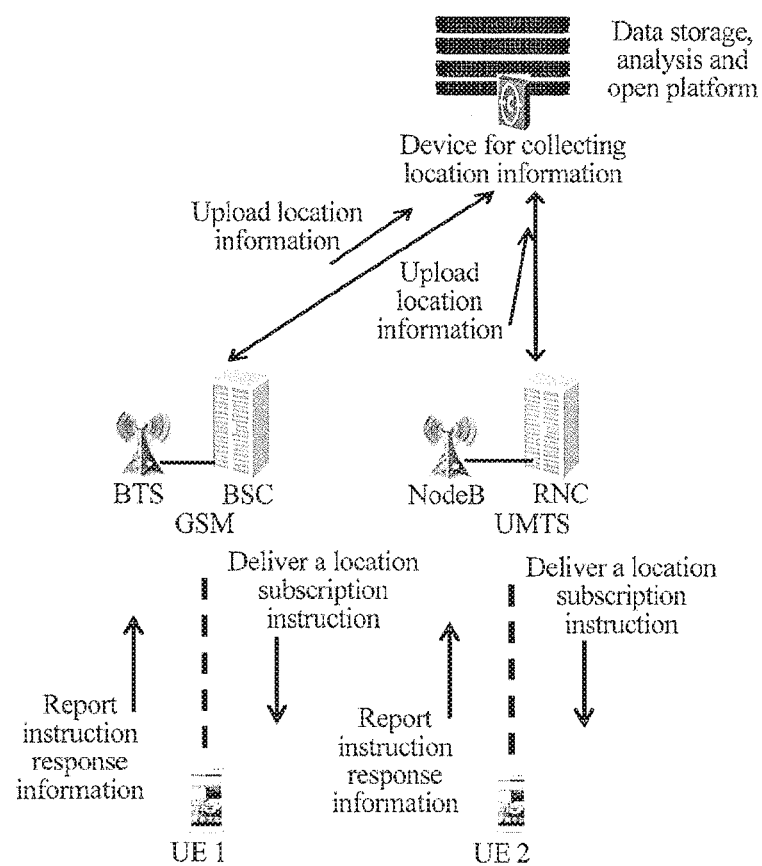
FIG. 11-d

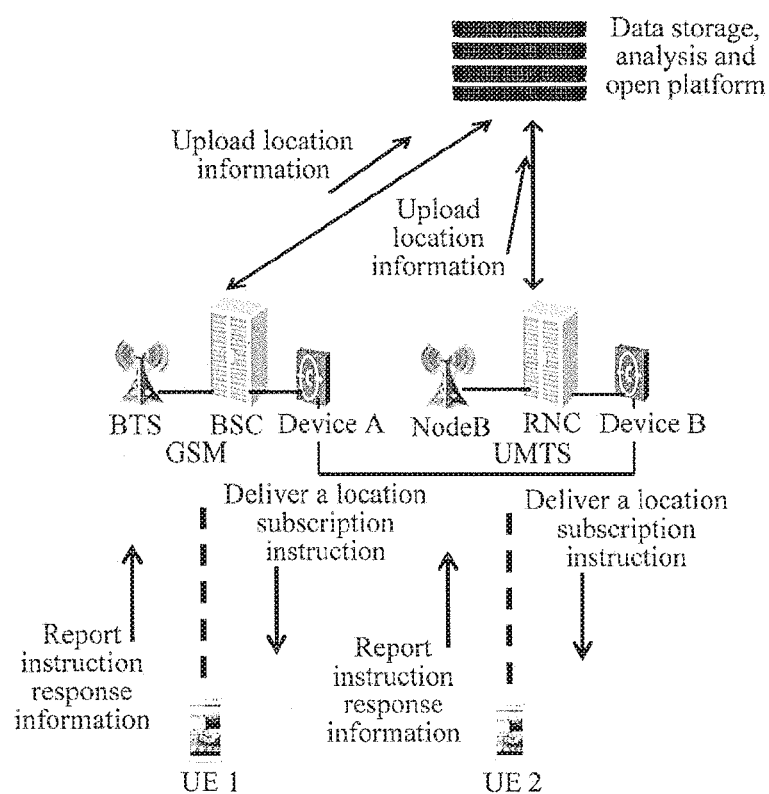
FIG. 11-e

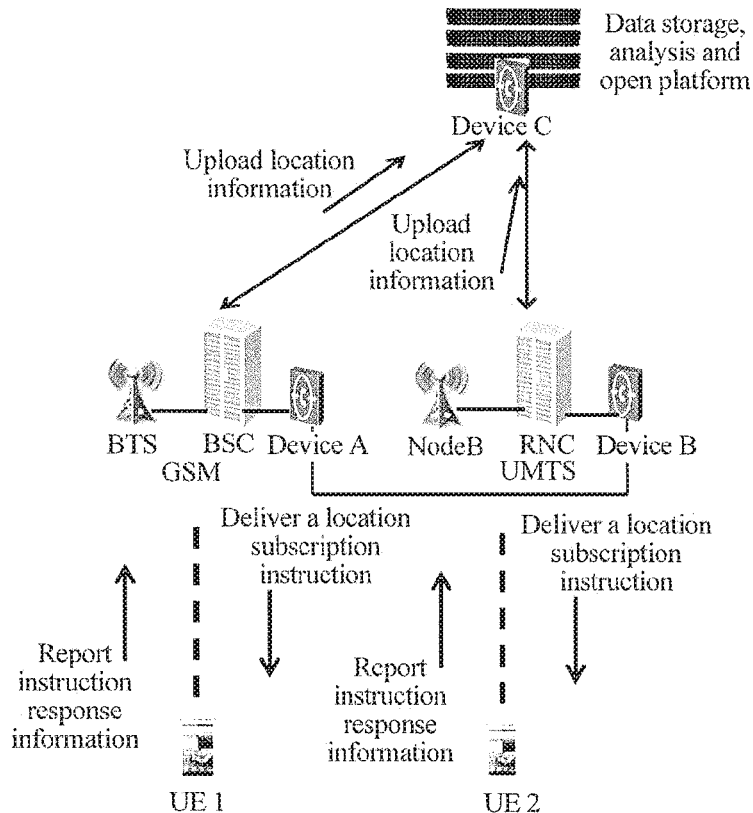
FIG. 11-f
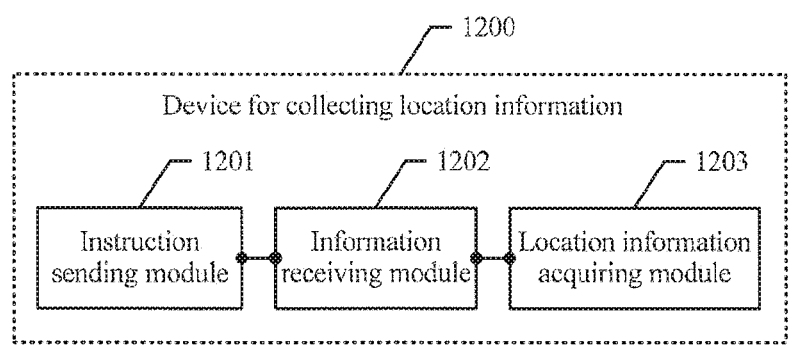
FIG. 12-a

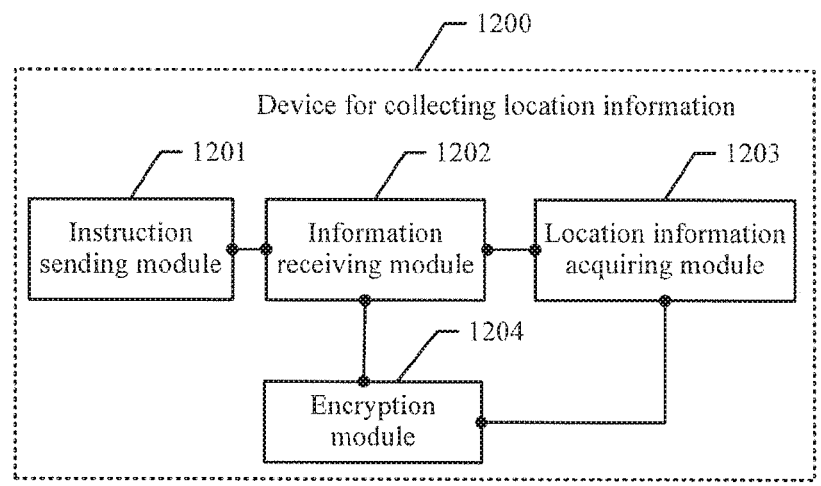
FIG. 12-b
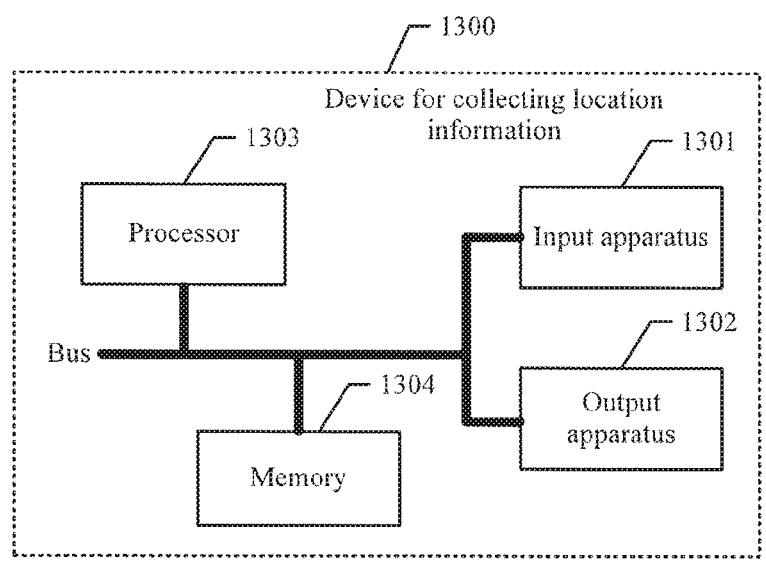
FIG. 13

METHOD AND DEVICE FOR COLLECTING LOCATION INFORMATION

CROSS-REFERENCE TO RELATED APPLICATIONS

This application is a continuation of International Application No. PCT/CN2014/093025, filed on Dec. 4, 2014, which claims priority to Chinese Patent Application No. 201310752729.X, filed on Dec. 31, 2013, both of which are hereby incorporated by reference in their entireties.

TECHNICAL FIELD

The present invention relates to the field of communications technologies, and in particular, to a method and device for collecting location information.

BACKGROUND

As mobile communication network data increases explosively, operators hope that, in addition to providing a "transmission" pipe function, a current network can also provide an "information" pipe function, so as to implement information openness. In a mobile communication network, there are multiple uses for collecting location information of a mobile subscriber, for example, data analysis used in multiple industries. For example, location information may be used for transportation planning of a "smart city". Population distribution is analyzed by using location information of mobile subscribers, so as to carry out work in, for example, smart transportation planning.

In the prior art, there is a method for acquiring location information of a user. Specifically, user equipment (UE) may locate a location of the user equipment by using a satellite, for example, locating by using a global positioning system (GPS). After a user logs in to a server by using an application program installed on the user equipment, the user equipment locates the location of the user equipment by using the satellite and reports location information to the server, and the server performs a further application operation according to the location information reported by the user equipment.

It is found that an application scenario of acquiring the location information of the user in the prior art is greatly limited, and universality is poor.

SUMMARY

Embodiments of the present invention provide a method and device for collecting location information. Location information of user equipment can be acquired in indoor and outdoor scenarios in which the user equipment is located and in a scenario in which no specific application program is installed on the user equipment; universality is very strong.

To resolve the foregoing technical problems, the embodiments of the present invention provide the following technical solutions:

According to a first aspect, an embodiment of the present invention provides a method for collecting location information, where the method includes:

sending a location subscription instruction to user equipment UE by using a mobile communication network, where the location subscription instruction includes: instructing the UE to measure a cell detected by the UE;

receiving instruction response information reported by the UE, where the instruction response information includes an ID of the UE, an ID of the cell detected by the UE, and signal strength information of the cell detected by the UE; and acquiring location information of the UE according to the received instruction response information.

With reference to the first aspect, in a first possible implementation manner of the first aspect, the mobile communication network is a Universal Mobile Telecommunications System UMTS network, and when the UE is in a cell-dedicated channel Cell DCH state on the UMTS network, the sending a location subscription instruction to user equipment UE by using a mobile communication network is:

sending, by a radio network controller RNC, a measurement control message to the UE by using the UMTS network, so that the UE measures, according to the measurement control message, the cell detected by the UE; and the receiving instruction response information reported by the UE includes:

receiving, by the RNC, a measurement report message sent by the UE, where the measurement report message includes the ID of the UE, the ID of the cell detected by the UE, and the signal strength information of the cell detected by the UE.

With reference to the first aspect, in a second possible implementation manner of the first aspect, the receiving instruction response information reported by the UE includes:

when the UE is in an idle mode on a UMTS network, receiving, by an RNC, a radio resource control (RRC) connection request message sent by the UE, where the RRC connection request message includes the ID of the UE, the ID of the cell detected by the UE, and the signal strength information of the cell detected by the UE.

With reference to the first aspect, in a third possible implementation manner of the first aspect, the receiving instruction response information reported by the UE includes:

when the UE is in a cell-forward access channel Cell FACH state, a cell paging channel Cell PCH state, or a Universal Mobile Telecommunications System terrestrial radio access network registration area paging channel (URA PCH) state on a UMTS network, receiving, by an RNC, a cell update message sent by the UE, where the cell update message includes the ID of the UE, the ID of the cell detected by the UE, and the signal strength information of the cell detected by the UE.

With reference to the first possible or second possible or third possible implementation manner of the first aspect, in a fourth possible implementation manner of the first aspect, the signal strength information is received signal code power RSCP information or ratio of energy per modulating bit to the noise spectral density Ec/No information.

With reference to the first aspect, in a fifth possible implementation manner of the first aspect, the mobile communication network is a Long Term Evolution LTE network, and when the UE is in a connected mode on the LTE network, the sending a location subscription instruction to user equipment UE by using a mobile communication network is:

sending, by an evolved NodeB eNodeB, a measurement control message to the UE by using the LTE network, so that the UE measures, according to the measurement control message, the cell detected by the UE; and the receiving instruction response information reported by the UE includes:

receiving, by the eNodeB, a measurement report message sent by the UE, where the measurement report message includes the ID of the UE, the ID of the cell detected by the UE, and the signal strength information of the cell detected by the UE.

With reference to the first aspect, in a sixth possible implementation manner of the first aspect, the receiving instruction response information reported by the UE includes:

when the UE is in an idle mode on an LTE network, receiving, by an eNodeB, an RRC connection request message sent by the UE, where the RRC connection request message includes the ID of the UE, the ID of the cell detected by the UE, and the signal strength information of the cell detected by the UE.

With reference to the fifth possible or sixth possible implementation manner of the first aspect, in a seventh possible implementation manner of the first aspect, the signal strength information is reference signal received power RSRP information or reference signal received quality RSRQ information.

With reference to the first aspect, in an eighth possible implementation manner of the first aspect, the mobile communication network is a Global System for Mobile Communications (GSM) network, and when the UE is in a general packet radio service transfer (GPRS Transfer) mode on the GSM network, the sending a location subscription instruction to user equipment UE by using a mobile communication network is:

sending, by a base station controller BSC, a measurement control message to the UE by using the GSM network, so that the UE measures, according to the measurement control message, the cell detected by the UE; and the receiving instruction response information reported by the UE includes:

receiving, by the BSC, a measurement report message sent by the UE, where the measurement report message includes the ID of the UE, the ID of the cell detected by the UE, and the signal strength information of the cell detected by the UE.

With reference to the first aspect, in a ninth possible implementation manner of the first aspect, the receiving instruction response information reported by the UE includes:

when the UE is in a general packet radio service packet idle (GPRS Packet Idle) mode on a GSM network, receiving, by a BSC, a connection request message sent by the UE, where the connection request message includes the ID of the UE, the ID of the cell detected by the UE, and the signal strength information of the cell detected by the UE.

With reference to the eighth possible or ninth possible implementation manner of the first aspect, in a tenth possible implementation manner of the first aspect, the signal strength information is received signal strength indicator (RSSI) information.

With reference to the first aspect, in an eleventh possible implementation manner of the first aspect, after the receiving instruction response information reported by the UE, the method further includes:

encrypting the ID of the UE to obtain an anonymous identity, where the anonymous identity is in a one-to-one correspondence with the ID of the UE.

With reference to the first aspect, in a twelfth possible implementation manner of the first aspect, the ID of the UE is an international mobile subscriber identity IMSI.

With reference to the first aspect, in a thirteenth possible implementation manner of the first aspect, the location subscription instruction includes: instructing the UE to measure, according to a preconfigured measurement period, the cell detected by the UE;

the receiving instruction response information reported by the UE includes:

receiving multiple pieces of instruction response information reported by the UE according to the preconfigured measurement period; and the acquiring location information of the UE according to the received instruction response information includes:

obtaining location movement information of the UE by means of calculation according to the multiple pieces of received instruction response information.

With reference to the first aspect, in a fourteenth possible implementation manner of the first aspect, the acquiring location information of the UE according to the received instruction response information includes:

sending the received instruction response information to a data storage, analysis and open platform, and obtaining, by the data storage, analysis and open platform, the location information of the UE by means of calculation according to the instruction response information.

According to a second aspect, an embodiment of the present invention further provides a device for collecting location information, where the device includes:

an instruction sending module, configured to send a location subscription instruction to user equipment UE by using a mobile communication network, where the location subscription instruction includes: instructing the UE to measure a cell detected by the UE;

an information receiving module, configured to receive instruction response information reported by the UE, where the instruction response information includes an ID of the UE, an ID of the cell detected by the UE, and signal strength information of the cell detected by the UE; and a location information acquiring module, configured to acquire location information of the UE according to the received instruction response information.

With reference to the second aspect, in a first possible implementation manner of the second aspect, the mobile communication network is a Universal Mobile Telecommunications System (UMTS) network, and when the UE is in a cell-dedicated channel Cell DCH state on the UMTS network, the device for collecting location information is a radio network controller RNC;

the instruction sending module is configured to send a measurement control message to the UE by using the UMTS network, so that the UE measures, according to the measurement control message, the cell detected by the UE; and the information receiving module is configured to receive a measurement report message sent by the UE, where the measurement report message includes the ID of the UE, the ID of the cell detected by the UE, and the signal strength information of the cell detected by the UE.

With reference to the second aspect, in a second possible implementation manner of the second aspect, the mobile communication network is a UMTS network, and the device for collecting location information is a radio network controller (RNC); and the information receiving module is configured to: when the UE is in an idle mode on the UMTS network, receive a radio resource control (RRC) connection request message sent by the UE, where the RRC connection request message includes the ID of the UE, the ID of the cell detected by the UE, and the signal strength information of the cell detected by the UE.

With reference to the second aspect, in a third possible implementation manner of the second aspect, the mobile communication network is a UMTS network, and the device for collecting location information is a radio network controller RNC; and the information receiving module is configured to: when the UE is in a cell-forward access channel Cell FACH state, a cell paging channel Cell PCH state, or a Universal Mobile Telecommunications System terrestrial radio access network registration area paging channel URA PCH state on the UMTS network, receive a cell update message sent by the UE, where the cell update message includes the ID of the UE, the ID of the cell detected by the UE, and the signal strength information of the cell detected by the UE.

With reference to the first possible or second possible or third possible implementation manner of the second aspect, in a fourth possible implementation manner of the second aspect, the signal strength information received by the information receiving module is received signal code power RSCP information or ratio of energy per modulating bit to the noise spectral density Ec/No information.

With reference to the second aspect, in a fifth possible implementation manner of the second aspect, the mobile communication network is a Long Term Evolution LTE network, and when the UE is in a connected mode on the LTE network, the device for collecting location information is an evolved NodeB eNodeB;

the instruction sending module is configured to send a measurement control message to the UE by using the LTE network, so that the UE measures, according to the measurement control message, the cell detected by the UE; and the information receiving module is configured to receive a measurement report message sent by the UE, where the measurement report message includes the ID of the UE, the ID of the cell detected by the UE, and the signal strength information of the cell detected by the UE.

With reference to the second aspect, in a sixth possible implementation manner of the second aspect, the mobile communication network is an LTE network, and the device for collecting location information is an evolved NodeB eNodeB; and the information receiving module is configured to: when the UE is in an idle mode on the LTE network, receive an RRC connection request message sent by the UE, where the RRC connection request message includes an S1AP ID of the UE, an ID of a cell in which the UE is located, the ID of the cell detected by the UE, and the signal strength information of the cell detected by the UE.

With reference to the fifth possible or sixth possible implementation manner of the second aspect, in a seventh possible implementation manner of the second aspect, the signal strength information received by the information receiving module is reference signal received power RSRP information or reference signal received quality RSRQ information.

With reference to the second aspect, in an eighth possible implementation manner of the second aspect, the mobile communication network is a Global System for Mobile Communications GSM network, and when the UE is in a general packet radio service transfer (GPRS Transfer) mode on the GSM network, the device for collecting location information is a base station controller BSC;

the instruction sending module is configured to send a measurement control message to the UE by using the GSM network, so that the UE measures, according to the measurement control message, the cell detected by the UE; and the information receiving module is configured to receive a measurement report message sent by the UE, where the measurement report message includes the ID of the UE, an ID of a cell in which the UE is located, the ID of the cell detected by the UE, and the signal strength information of the cell detected by the UE.

With reference to the second aspect, in a ninth possible implementation manner of the second aspect, the mobile communication network is a GSM network, and the device for collecting location information is a base station controller (BSC); and the information receiving module is configured to: when the UE is in a general packet radio service packet idle (GPRS Packet Idle) mode on the GSM network, receive a connection request message sent by the UE, where the connection request message includes the ID of the UE, the ID of the cell detected by the UE, and the signal strength information of the cell detected by the UE.

With reference to the eighth possible or ninth possible implementation manner of the second aspect, in a tenth possible implementation manner of the second aspect, the signal strength information received by the information receiving module is received signal strength indicator RSSI information.

With reference to the second aspect, in an eleventh possible implementation manner of the second aspect, the device for collecting location information further includes an encryption module, configured to: after the location information acquiring module receives the instruction response information reported by the UE, encrypt the ID that is of the UE and that is included in the instruction response information, to obtain an anonymous identity, where the anonymous identity is in a one-to-one correspondence with the ID of the UE.

With reference to the second aspect, in a twelfth possible implementation manner of the second aspect, the ID that is of the UE and that is included in the instruction response information received by the information receiving module is an international mobile subscriber identity IMSI.

With reference to the second aspect, in a thirteenth possible implementation manner of the second aspect, the location subscription instruction sent by the instruction sending module included: instructing the UE to measure, according to a preconfigured measurement period, the cell detected by the UE;

the information receiving module is configured to receive multiple pieces of instruction response information reported by the UE according to the preconfigured measurement period; and the location information acquiring module is configured to obtain location movement information of the UE by means of calculation according to the multiple pieces of received instruction response information.

With reference to the second aspect, in a fourteenth possible implementation manner of the second aspect, the location information acquiring module is configured to send the received instruction response information to a data storage, analysis and open platform, and the data storage, analysis and open platform obtains the location information of the UE by means of calculation according to the instruction response information.

It can be learned from the foregoing technical solutions that the embodiments of the present invention have the following advantages:

In the embodiments of the present invention, first, a location subscription instruction is sent to UE by using a mobile communication network, so as to instruct the UE to measure, according to the location subscription instruction, a cell detected by the UE; after the UE generates, according to the location subscription instruction, an ID of the cell detected by the UE and signal strength information of the cell detected by the UE, instruction response information reported by the UE is received, where the instruction response information includes an ID of the UE, the ID of the cell detected by the UE, and the signal strength information of the cell detected by the UE; finally, location information of the UE may be acquired according to the received instruction response information. In the embodiments of the present invention, because a location subscription instruction may be delivered to UE, location information of the UE may be acquired according to received instruction response information reported by the UE, and the UE does not need to locate a location of the UE by using a satellite, electricity of the UE may be saved. For a mobile communication network, no matter whether the UE is indoors or outdoors, the instruction response information reported by the UE can be received provided that a wireless network signal is available. In addition, in the embodiments of the present invention, the location information of the UE can be acquired by using the existing mobile communication network, and the UE does not need to successfully log in to a server by using a specific application program; therefore, a problem of application program promotion does not exist. Therefore, the method for collecting location information provided in the embodiments of the present invention is not limited to an application scenario such as an indoor scenario, an outdoor scenario, or whether an application program is installed, and has very strong universality.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons skilled in the art may still derive other drawings from these accompanying drawings.

FIG. 11-a is a schematic diagram of a specific implementation manner, on a mobile communication network, of a device for collecting location information according to an embodiment of the present invention;

FIG. 11-b is a schematic diagram of another specific implementation manner, on a mobile communication network, of a device for collecting location information according to an embodiment of the present invention;

FIG. 11-c is a schematic diagram of another specific implementation manner, on a mobile communication network, of a device for collecting location information according to an embodiment of the present invention;

FIG. 11-d is a schematic diagram of another specific implementation manner, on a mobile communication network, of a device for collecting location information according to an embodiment of the present invention;

FIG. 11-e is a schematic diagram of another specific implementation manner, on a mobile communication network, of a device for collecting location information according to an embodiment of the present invention;

FIG. 11-f is a schematic diagram of another specific implementation manner, on a mobile communication network, of a device for collecting location information according to an embodiment of the present invention;

FIG. 12-a is a schematic structural diagram of composition of a device for collecting location information according to an embodiment of the present invention;

FIG. 12-b is another schematic structural diagram of composition of a device for collecting location information according to an embodiment of the present invention; and FIG. 13 is another schematic structural diagram of composition of a device for collecting location information according to an embodiment of the present invention.

DESCRIPTION OF EMBODIMENTS

Embodiments of the present invention provide a method and device for collecting location information. Location information of user equipment can be acquired in indoor and outdoor scenarios in which the user equipment is located and in a scenario in which no specific application program is installed on the user equipment; universality is very strong.

To make the objectives, features, and advantages of the present invention clearer and more comprehensible, the following describes the technical solutions in the embodiments of the present invention with reference to the accompanying drawings in the embodiments of the present invention. Apparently, the embodiments described in the following are merely some rather than all of the embodiments of the present invention. All other embodiments obtained by persons skilled in the art based on the embodiments of the present invention shall fall within the protection scope of the present invention.

In the specification, claims, and accompanying drawings of the present invention, the terms "include", "comprise" and any other variants mean to cover the non-exclusive inclusion, so that a process, method, system, product, or device that includes a list of units is not necessarily limited to those units, but may include other units not expressly listed or inherent to such a process, method, system, product, or device.

Details are separately illustrated in the following.

In the present invention, an embodiment of a method for collecting location information may be applied to location information collection of user equipment, and the method may include: sending a location subscription instruction to user equipment (UE) by using a mobile communication network, where the location subscription instruction includes: instructing the UE to measure a cell detected by the UE; receiving instruction response information reported by the UE, where the instruction response information includes an identity (_ID) of the UE, an ID of the cell detected by the UE, and signal strength information of the cell detected by the UE; and acquiring location information of the UE according to the received instruction response information.

Figure 1:
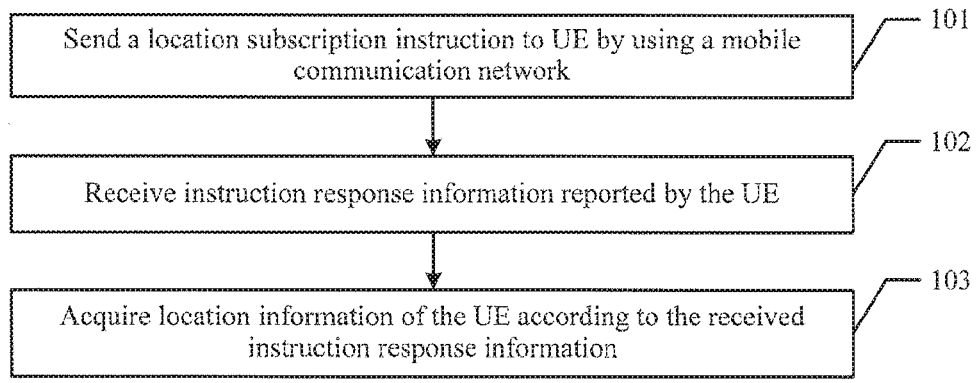
FIG. 1 is a schematic block flowchart of a method for collecting location information according to an embodiment of the present invention.

Referring to FIG. 1, a method for collecting location information provided in an embodiment of the present invention may include:

101. Send a location subscription instruction to UE by using a mobile communication network.

The location subscription instruction includes: instructing the UE to measure a cell detected by the UE.

In this embodiment of the present invention, because a device for collecting location information and the UE are on the same mobile communication network, there is a communication connection established between the device for collecting location information and the UE, so that communication between the device for collecting location information and the UE may be implemented.

First, when the device for collecting location information needs to collect a location information of the UE, the device for collecting location information may send the location subscription instruction to the UE by using the mobile communication network, and the device for collecting location information instructs, by using the location subscription instruction, the UE to measure the cell detected by the UE. It should be noted that a specific instruction format of the location subscription instruction sent by the device for collecting location information to the UE may be negotiated between the device for collecting location information and the UE, so as to determine an instruction format used for transferring the location subscription instruction, or an instruction format already constructed on the mobile communication network may be used to transfer the location subscription instruction. Specifically, how to transfer the location subscription instruction may be determined according to a network standard of the mobile communication network, or an existing signaling format on the mobile communication network may be modified or redefined, so as to be used for transferring the location subscription instruction. In addition, when the UE receives the location subscription instruction sent by the device for collecting location information, the UE may measure the cell detected by the UE.

102. Receive instruction response information reported by the UE.

The instruction response information includes an ID of the UE, an ID of the cell detected by the UE, and signal strength information of the cell detected by the UE.

In this embodiment of the present invention, after the device for collecting location information delivers the location subscription instruction to the UE, and after the UE measures, according to the location subscription instruction, the cell detected by the UE, the UE may acquire the ID of the cell detected by the UE and the signal strength information of the cell detected by the UE. The ID of the cell detected by the UE refers to an ID of a cell in which the UE is located and an ID of a neighboring cell. In addition, there may be one or more cells detected by the UE. The UE generates the instruction response information, and adds, to the instruction response information, the ID of the cell detected by the UE, the signal strength information of each cell detected by the UE, and the ID of the UE. The UE sends, by using the mobile communication network, the instruction response information to the device for collecting location information, and therefore, the device for collecting location information may receive, by using the mobile communication network, the instruction response information reported by the UE. The neighboring cell of the cell in which the UE is located refers to a cell adjacent to the cell in which the UE is located. Multiple neighboring cells of the cell in which the UE is located may be recorded in a Cell ID list of the neighboring cell. The signal strength information in each cell of the UE refers to signal strength of the cell in which the UE is located and signal strength of a neighboring cell of the cell in which the UE is located.

It should be noted that in this embodiment of the present invention, there may be multiple implementation manners of measuring, by the UE according to the location subscription instruction, the cell detected by the UE. For example, the UE may measure, in a manner that is for measuring the cell in which the UE is located and that exists in the mobile communication network, the cell detected by the UE, to generate the instruction response information of the UE and report the instruction response information of the UE to the device for collecting location information. In subsequent embodiments, for multiple standards of mobile communication networks and for different states of the UE on the mobile communication networks, that the UE measures the cell detected by the UE is described.

It should be noted that in some embodiments of the present invention, after the receiving instruction response information reported by the UE in step 102, the method may further include the following step:

encrypting the ID that is of the UE and that is included in the instruction response information, to obtain an anonymous identity, where the anonymous identity is in a one-to-one correspondence with the ID of the UE.

In some embodiments of the present invention, the ID that is of the UE and that is included in the instruction response information may be an international mobile subscriber identity (IMSI), or may certainly be another identity that identifies the UE. To avoid an unnecessary loss caused, to a user using the UE, by the location information of the UE, after receiving the instruction response information reported by the UE, the device for collecting location information may further encrypt the ID of the UE, to obtain the anonymous identity, where the anonymous identity is in a one-to-one correspondence with the ID of the UE. That is, anonymization processing on the ID of the UE may well ensure that privacy of the user is not leaked. In addition, an anonymous identity is further generated when anonymization processing is performed on the ID of the UE. Therefore, the location information of the UE may further correspond to the anonymous identity, and a further operation for the location information of the UE is not affected in subsequent application.

For example, an actual ID (the IMSI) of the user may be included when the UE reports the instruction response information to the device for collecting location information. Anonymizing the ID of the UE may implement encryption of the IMSI to obtain an IMSI', thereby establishing a one-to-one correspondence between the IMSI and the IMSI'. When data analysis is performed on location information of UE, the IMSI' is used to correspond to location information of the UE, and therefore, user privacy may be effectively protected from being leaked.

It should be noted that in this embodiment of the present invention, there may be multiple implementation manners of encrypting the ID of the UE. For example, the ID of the UE may be encrypted according to data encryption standard (DES). This algorithm has a relatively high speed and is applicable to a scenario in which a large amount of data is to be encrypted. Alternatively, the ID of the UE may also be encrypted according to international data encryption algorithm (IDEA). A 128-bit key is used in this algorithm, and therefore, extremely good security can be provided.

103. Acquire location information of the UE according to the received instruction response information.

In this embodiment of the present invention, after the device for collecting location information receives the instruction response information reported by the UE, the device for collecting location information may acquire the location information of the UE according to the received instruction response information. The location information refers to longitude and latitude location information of the UE. That is, the location of the UE is represented by using geographic coordinates.

There may be multiple implementation manners of acquiring the location information of the UE according to the received instruction response information. Based on the ID of the cell detected by the UE and the signal strength of each cell detected by the UE that are carried in the instruction response information, the ID of the cell detected by the UE may be acquired from the instruction response information; therefore, a base station to which the UE attaches may be determined. Because the base station is generally fixed at a location, and longitude and latitude location information is determined, first, a general location of the UE is determined, and then the location information of the UE may be obtained by means of precise calculation according to the signal strength in each cell of the UE.

It should be noted that in this embodiment of the present invention, the device for collecting location information may simultaneously deliver the location subscription instruction to multiple UEs, and each of the multiple UEs measures a cell detected by the UE, and then may acquire an ID of the cell detected by the UE. Each UE reports, by using the mobile communication network, instruction response information of the UE to the device for collecting location information, and the device for collecting location information may acquire multiple pieces of location information of the UEs, so that data analysis may further be performed on these pieces of location information of the UEs for application to a variety of industry applications such as transportation planning and marketing analysis.

It should be noted that in some embodiments of the present invention, specifically, the device for collecting location information may perform calculation on the received instruction response information, so as to acquire the location information of the UE. After obtaining the location information of the UEs by means of calculation, the device for collecting location information may send the location information to a data storage, analysis and open platform. The data storage, analysis and open platform performs further data analysis on these pieces of location information of the UEs for application to a variety of industry applications such as transportation planning and marketing analysis. The data storage, analysis and open platform, specially used for storing and analyzing big data, may be independent of an existing mobile communication network and may be a new device superimposed over the mobile communication network. In some other embodiments of the present invention, the acquiring location information of the UE according to the received instruction response information in step 103 may include the following step:

sending the received instruction response information to a data storage, analysis and open platform, and obtaining, by the data storage, analysis and open platform, the location information of the UE by means of calculation according to the instruction response information.

After the device for collecting location information receives the instruction response information reported by the UE, the device for collecting location information sends the received instruction response information to the data storage, analysis and open platform, and the data storage, analysis and open platform obtains the location information of the UE by means of calculation according to the instruction response information of the UE. That is, after the device for collecting location information receives the instruction response information of the UE, the data storage, analysis and open platform obtains the location information of the UE by means of calculation; therefore, distributed deployment of devices can be implemented to reduce a performance requirement on a single device, and calculation for the location information of the UE can also be implemented. For example, when the device for collecting location information has a limited calculation capability or load balancing needs to be performed, if a large amount of instruction response information reported by the UE is received, the device for collecting location information may obtain some location information of the UE by means of calculation, and sends instruction response information beyond the calculation capability of the device for collecting location information to the data storage, analysis and open platform, and the data storage, analysis and open platform obtains the other location information of the UE by means of calculation, so that distributed deployment of devices can be implemented.

It should be noted that in some embodiments of the present invention, the location subscription instruction includes: instructing the UE to measure, according to a preconfigured measurement period, the cell detected by the UE, where the receiving instruction response information reported by the UE in step 102 includes:

receiving multiple pieces of instruction response information reported by the UE according to the preconfigured measurement period; and the acquiring location information of the UE according to the received instruction response information in step 103 includes:

obtaining location movement information of the UE by means of calculation according to the multiple pieces of received instruction response information.

If the location subscription instruction delivered by the device for collecting location information to the UE instructs the UE to measure, according to the preconfigured measurement period, the cell detected by the UE, the UE periodically measures the cell detected by the UE according to the preconfigured measurement period, and the UE generates instruction response information in every measurement period. For example, the measurement period is 12 seconds (s). Therefore the UE periodically generates multiple pieces of instruction response information. The device for collecting location information may receive the multiple pieces of instruction response information of the UE. After pieces of location information of the UE are separately obtained by means of calculation according to the multiple pieces of instruction response information of the UE, cluster analysis is performed on these pieces of location information of the UE obtained by means of calculation, and then the location movement information of the UE may be obtained by means of calculation. The location movement information refers to a movement and change status of the location of the UE within a time period, and generally, the location movement information may also be referred to as a digital footprint file; that is, a movement trail of the UE may be depicted by using the location movement information. Further data analysis performed on these pieces of information may be applied to a variety of industry applications such as transportation planning and marketing analysis. The preconfigured measurement period may be configured according to a requirement of an application service, impact on power consumption of the UE, and impact on network load, so as to achieve an optimal effect. Moreover, frequency of signaling reporting of the UE may be controlled according to the preconfigured measurement period, and therefore may be adjusted according to impact on network performance, avoiding causing too much impact on the network load. If the UE frequently reports signaling, an enormous amount of signaling needs to be processed, which increases a burden on the UE. Frequency that the UE reports the instruction response message may be adjusted by setting the measurement period, thereby not only meeting an application requirement but also avoiding increasing a great burden on the UE.

In this embodiment of the present invention, the UE is inevitably located on the mobile communication network. To locate the location of the UE, it is found by analyzing the mobile communication network that, as a cellular network, the mobile communication network may be used to locate the UE. For example, a cell to which the UE attaches on the cellular network may be used for performing locating. That is, the location of the UE is determined by using a location of the cell. Because a base station on a cellular network manages one or more cells, and UE attaches to the cell, the UE that attaches to the cell managed by the base station can be located by using a deployment location of the base station; therefore, location information of the UE is acquired.

It should be noted that in this embodiment of the present invention, collecting the location information of the UE may be implemented without requiring installing a specific application program on the UE or without requiring logging in to a server by the UE. In this embodiment of the present invention, the location information of the UE can be collected provided that the UE can normally communicate, and the method does not depend on a standard of the mobile communication network or a type of the UE. In this embodiment of the present invention, no matter whether the UE is an ordinary terminal or an intelligent terminal, provided that a wireless network signal is available, the location information of the UE can be successfully collected by using a communication connection between the device for collecting location information and the UE.

It can be learned from the foregoing description in this embodiment of the present invention that, first, a location subscription instruction is sent to UE by using a mobile communication network, so as to instruct the UE to measure, according to the location subscription instruction, a cell detected by the UE; after the UE generates, according to the location subscription instruction, an ID of the cell detected by the UE and signal strength information of the cell detected by the UE, instruction response information reported by the UE is received, where the instruction response information includes an ID of the UE, the ID of the cell detected by the UE, and the signal strength information of the cell detected by the UE; finally, location information of the UE may be acquired according to the received instruction response information. In this embodiment of the present invention, because a location subscription instruction may be delivered to UE, location information of the UE may be acquired according to received instruction response information reported by the UE, and the UE does not need to locate a location of the UE by using a satellite, electricity of the UE may be saved. For a mobile communication network, no matter whether the UE is indoors or outdoors, the instruction response information reported by the UE can be received provided that a wireless network signal is available. In addition, in this embodiment of the present invention, the location information of the UE can be acquired by using the existing mobile communication network, and the UE does not need to successfully log in to a server by using a specific application program; therefore, a problem of application program promotion does not exist. Therefore, the method for collecting location information provided in this embodiment of the present invention is not limited to an application scenario such as an indoor scenario, an outdoor scenario, or whether an application program is installed; universality is very strong.

Details are described in the following for standards of different mobile communication networks and states of the UE on the mobile networks. However, the following embodiments provide only some standards of mobile communication networks, which may be applied to other standards of mobile communication networks according to technical features described in the embodiments of the present invention. The description herein is only for an illustration purpose, and is not used to limit the present invention.

Figure 2:
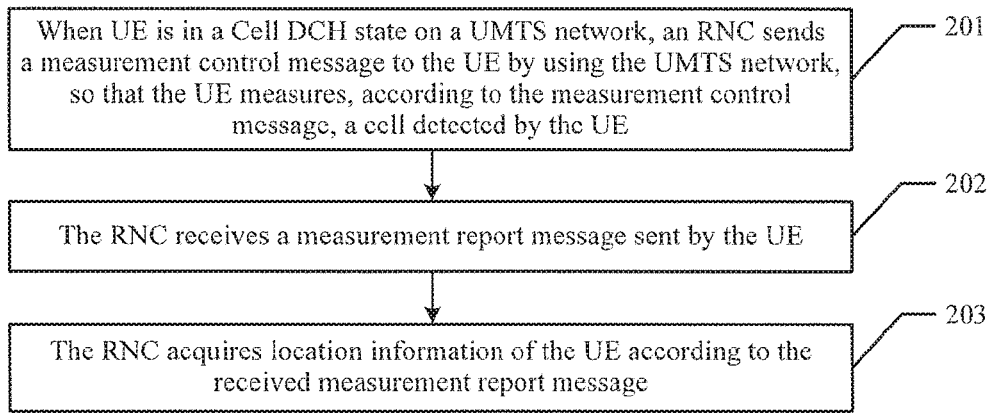
FIG. 2 is a schematic block flowchart of another method for collecting location information according to an embodiment of the present invention.

Referring to FIG. 2, when a mobile communication network is a universal mobile telecommunications system (UMTS) network, a method for collecting location information provided in another embodiment of the present invention may include the following steps:

201. When UE is in a cell-dedicated channel (Cell DCH) state on the UMTS network, a radio network controller (RNC) sends a measurement control message to the UE by using the UMTS network, so that the UE measures, according to the measurement control message, a cell detected by the UE.

In this embodiment of the present invention, when the mobile communication network is the UMTS network, a device for collecting location information may be the RNC. Because the RNC and the UE are on the same UMTS network, there is a communication connection established between the RNC and the UE, so that communication between the RNC and the UE may be implemented.

When the UE is in the Cell DCH state on the UMTS network, the RNC sends the measurement control message to the UE by using the UMTS network. The sending a location subscription instruction to UE by using a mobile communication network in the foregoing embodiment may be: sending, by the RNC, the Measurement Control message to the UE by using the UMTS network, so that the UE may measure, according to an instruction of the Measurement Control message, the cell detected by the UE. After measuring, according to the Measurement Control message, the cell detected by the UE, the UE may generate an ID of a cell in which the UE is located and an ID of a neighboring cell of the cell. Afterward, the UE generates a measurement report message, and adds, to the Measurement Report message, an ID of the cell detected by the UE and signal strength information of the cell detected by the UE, and then the UE may send the Measurement Report message to the RNC.

202. The RNC receives a measurement report message sent by the UE.

The measurement report message includes an ID of the UE, the ID of the cell detected by the UE, and the signal strength information of the cell detected by the UE.

The RNC may receive, by using the UMTS network, the Measurement Report message reported by the UE, and therefore may acquire the ID of the UE, the ID of the cell detected by the UE, and the signal strength information of the cell detected by the UE, and may implement locating of the UE according to the information.

It should be noted that in this embodiment of the present invention, the UE may periodically report the Measurement Report message to the RNC, for example, report the Measurement Report message of the UE once every 12 s, and the Measurement Report message may be the instruction response information described in the foregoing embodiment. In addition, the UE also reports the Measurement Report message to the RNC when the UE initiates handover, and the Measurement Report message may also be used for location calculation for the UE. Because a piece of longitude and latitude location information of the UE may be obtained by means of calculation according to each Measurement Report message, location movement trail information of the UE may be obtained.

203. The RNC acquires location information of the UE according to the received measurement report message.

It should be noted that the measurement report message is the instruction response information reported by the UE in the foregoing embodiment. In some embodiments of the present invention, specifically, the RNC may perform calculation on the received instruction response information, so as to acquire the location information of the UE. After obtaining location information of the UE by means of calculation, the RNC may send the location information to a data storage, analysis and open platform. The data storage, analysis and open platform performs further data analysis on these pieces of location information of the UE for application to a variety of industry applications such as transportation planning and marketing analysis. The data storage, analysis and open platform, specially used for storing and analyzing big data, may be independent of an existing mobile communication network and may be a new device superimposed over the mobile communication network. In some other embodiments of the present invention, the RNC may also send the received instruction response information to a data storage, analysis and open platform, and the data storage, analysis and open platform obtains the location information of the UE by means of calculation according to the instruction response information.

After the RNC receives the instruction response information reported by the UE, the RNC sends the received instruction response information to the data storage, analysis and open platform, and the data storage, analysis and open platform obtains the location information of the UE by means of calculation according to the instruction response information of the UE. That is, after the RNC receives the instruction response information of the UE, the data storage, analysis and open platform obtains the location information of the UE by means of calculation; therefore, distributed deployment of devices can be implemented to reduce a performance requirement on a single device, and calculation for the location information of the UE can also be implemented. For example, when the RNC has a limited calculation capability or load balancing needs to be performed, if a large amount of instruction response information reported by the UE is received, the RNC may obtain some location information of the UE by means of calculation, and sends instruction response information beyond a calculation capability of the RNC to the data storage, analysis and open platform, and the data storage, analysis and open platform obtains the other location information of the UE by means of calculation, so that distributed deployment of devices can be implemented.

It should be noted that in this embodiment of the present invention, when the UE is in the Cell DCH state on the UMTS network, because the location information of the UE may be acquired by using the measurement report message sent by the UE, the location information of the UE can be acquired no matter whether the UE performs a circuit switched (CS) domain service or a packet switched (PS) domain service. In another method for collecting location information existing in the prior art, a standard Iu interface message is acquired by disposing a probe on an Iu interface, so as to acquire location information of UE. In this external probe solution, only location information existing when the UE is on a CS domain voice call is collected, and location information existing when the UE performs PS domain data communication cannot be collected. In this embodiment of the present invention, the location information of the UE can be acquired no matter whether the UE performs a CS domain service or a PS domain service.

It can be learned from the foregoing description in this embodiment of the present invention that, because an RNC in this embodiment of the present invention may deliver a location subscription instruction to UE, and may acquire location information of the UE according to a received measurement report message sent by the UE, and the UE does not need to locate a location of the UE by using a satellite, electricity of the UE may be saved. For a mobile communication network, no matter whether the UE is indoors or outdoors, the measurement report message sent by the UE can be received provided that a wireless network signal is available. In addition, in this embodiment of the present invention, the location information of the UE can be acquired by using the existing mobile communication network, and the UE does not need to successfully log in to a server by using a specific application program. Therefore, the method for collecting location information provided in this embodiment of the present invention is not limited to an application scenario such as an indoor scenario, an outdoor scenario, or whether an application program is installed; universality is very strong.

Figure 3:
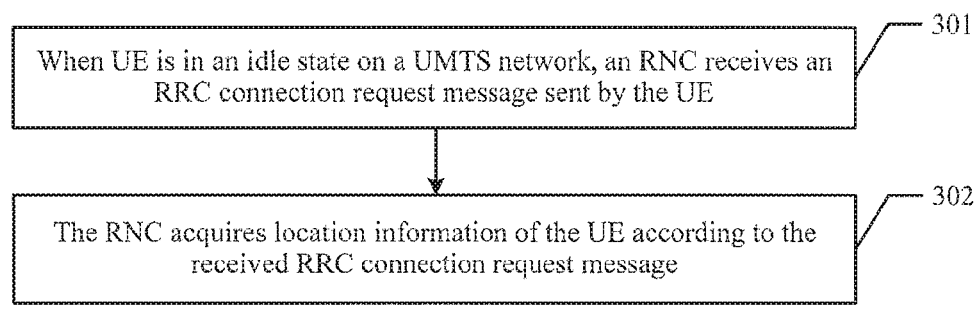
FIG. 3 is a schematic block flowchart of another method for collecting location information according to an embodiment of the present invention.

Referring to FIG. 3, when a mobile communication network is a UMTS network, in a method for collecting location information provided in another embodiment of the present invention, receiving instruction response information reported by UE may include the following steps:

301. When the UE is in an idle mode on the UMTS network, an RNC receives an RRC connection request message sent by the UE.

The RRC connection request message includes an ID of the UE, an ID of a cell detected by the UE, and signal strength information of the cell detected by the UE.

In this embodiment of the present invention, when the mobile communication network is the UMTS network, a device for collecting location information may be the RNC. Because the RNC and the UE are on the same UMTS network, there is a communication connection established between the RNC and the UE, so that communication between the RNC and the UE may be implemented. When the UE is in the idle mode on the UMTS network, the UE generates the radio resource control (RRC) connection request message, and adds, to the RRC connection request message, the ID of the UE, the ID of the cell detected by the UE, and the signal strength information of the cell detected by the UE; then, the UE may send the RRC connection request message to the RNC.

When the UE is in the Idle mode on the UMTS network, the RNC receives, by using the UMTS network, the RRC connection request message sent by the UE. After the RNC acquires, from the RRC connection request message, the ID of the UE, the ID of the cell detected by the UE, and the signal strength information of the cell detected by the UE, the RNC sends an RRC connection setup message to the UE by using the UMTS network. It should be noted that when the UE is in the Idle mode on the UMTS network, an ordinary location update, a periodic location update, and an attach process of the UE are all non-access stratum (NAS) messages from the UE to a core network. Before sending the NAS message, the UE needs to execute an RRC connection setup process first, and therefore the RNC may acquire the instruction response information of the UE by using a message in the RRC connection setup process.

302. The RNC acquires location information of the UE according to the received RRC connection request message.

It should be noted that the RRC connection request message is the instruction response information reported by the UE in the foregoing embodiment. In some embodiments of the present invention, specifically, the RNC may perform calculation on the received instruction response information, so as to acquire the location information of the UE. After obtaining location information of the UE by means of calculation, the RNC may send the location information to a data storage, analysis and open platform. The data storage, analysis and open platform performs further data analysis on these pieces of location information of the UE for application to a variety of industry applications such as transportation planning and marketing analysis. The data storage, analysis and open platform, specially used for storing and analyzing big data, may be independent of an existing mobile communication network and may be a new device superimposed over the mobile communication network. In some other embodiments of the present invention, the RNC may also send the received instruction response information to a data storage, analysis and open platform, and the data storage, analysis and open platform obtains the location information of the UE by means of calculation according to the instruction response information.

After the RNC receives the instruction response information reported by the UE, the RNC sends the received instruction response information to the data storage, analysis and open platform, and the data storage, analysis and open platform obtains the location information of the UE by means of calculation according to the instruction response information of the UE. That is, after the RNC receives the instruction response information of the UE, the data storage, analysis and open platform obtains the location information of the UE by means of calculation; therefore, distributed deployment of devices can be implemented to reduce a performance requirement on a single device, and calculation for the location information of the UE can also be implemented. For example, when the RNC has a limited calculation capability or load balancing needs to be performed, if a large amount of instruction response information reported by the UE is received, the RNC may obtain some location information of the UE by means of calculation, and sends instruction response information beyond a calculation capability of the RNC to the data storage, analysis and open platform, and the data storage, analysis and open platform obtains the other location information of the UE by means of calculation, so that distributed deployment of devices can be implemented.

It should be noted that in this embodiment of the present invention, when the UE is in the Idle mode on the UMTS network, the UE generally cannot periodically acquire the location information of the UE as the UE does in a Cell DCH state, and therefore obtains relatively less location information. Therefore, the method is suitable for performing statistical trend analysis on clustered locations of users on the entire UMTS network.

It should be noted that in this embodiment of the present invention, when the UE is in the Idle mode on the UMTS network, because the location information of the UE can be acquired by using the RRC connection request message sent by the UE, the location information of the UE can be acquired no matter whether the UE performs a CS domain service or a PS domain service. In another method for collecting location information existing in the prior art, a standard Iu interface message is acquired by disposing a probe on an Iu interface, so as to acquire location information of UE. In this external probe solution, only location information existing when the UE is on a CS domain voice call is collected, and location information existing when the UE performs PS domain data communication cannot be collected. In this embodiment of the present invention, the location information of the UE can be acquired no matter whether the UE performs a CS domain service or a PS domain service.

It can be learned from the foregoing description in this embodiment of the present invention that, because an RNC in this embodiment of the present invention can acquire location information of UE according to a received RRC connection request message reported by the UE, and the UE does not need to locate a location of the UE by using a satellite, electricity of the UE may be saved. For a mobile communication network, no matter whether the UE is indoors or outdoors, the RRC connection request message reported by the UE can be received provided that a wireless network signal is available. In addition, in this embodiment of the present invention, the location information of the UE can be acquired by using the existing mobile communication network, and the UE does not need to successfully log in to a server by using a specific application program. Therefore, the method for collecting location information provided in this embodiment of the present invention is not limited to an application scenario such as an indoor scenario, an outdoor scenario, or whether an application program is installed; universality is very strong.

Figure 4:
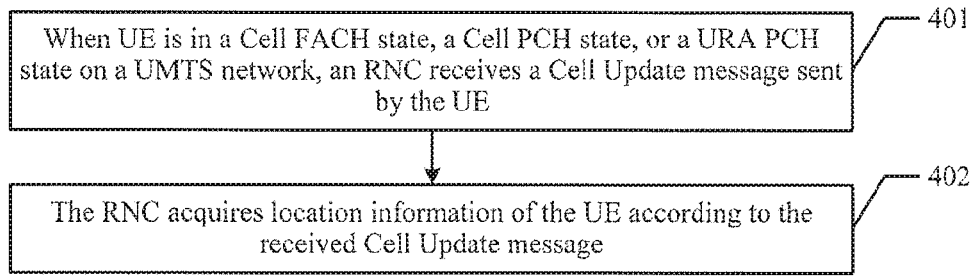
FIG. 4 is a schematic block flowchart of another method for collecting location information according to an embodiment of the present invention.

Referring to FIG. 4, when a mobile communication network is a UMTS network, in a method for collecting location information provided in another embodiment of the present invention, receiving instruction response information reported by UE may include the following steps:

401. When the UE is in a Cell FACH state, a Cell PCH state, or a URA PCH state on the UMTS network, an RNC receives a Cell Update message sent by the UE.

The Cell Update message includes an ID of the UE, an ID of a cell detected by the UE, and signal strength information of the cell detected by the UE.

In this embodiment of the present invention, when the mobile communication network is the UMTS network, a device for collecting location information may be the RNC. Because the RNC and the UE are on the same UMTS network, there is a communication connection established between the RNC and the UE, so that communication between the RNC and the UE may be implemented. When the UE is in the cell-forward access channel (Cell FACH) state, the cell paging channel (Cell PCH) state, or the Universal Mobile Telecommunications System terrestrial radio access network registration area paging channel (Universal Mobile Telecommunications System Terrestrial Radio Access Network Registration Area, URA PCH) state on the UMTS network, the UE generates the cell update message, and adds, to the Cell Update message, an ID of a cell in which the UE is located, the ID of the cell detected by the UE, and the signal strength information of the cell detected by the UE; then, the UE may send the Cell Update message to the RNC.

When the UE is in the Cell FACH state, the Cell PCH state, or the URA PCH state on the UMTS network, the RNC receives, by using the UMTS network, the Cell Update message sent by the UE. After the RNC acquires, from the Cell Update message, the ID of the UE, the ID of the cell detected by the UE, and the signal strength information of the cell detected by the UE, the RNC sends a cell update confirm message to the UE by using the UMTS network. It should be noted that when the UE is in the URA PCH state on the UMTS network, the RNC can acquire location information of the UE provided that the RNC initiates a cell update process only after a URA in which the UE is located changes.

402. The RNC acquires location information of the UE according to the received Cell Update message.

It should be noted that the Cell Update message is the instruction response information reported by the UE in the foregoing embodiment. In some embodiments of the present invention, specifically, the RNC may perform calculation on the received instruction response information, so as to acquire the location information of the UE. After obtaining location information of the UE by means of calculation, the RNC may send the location information to a data storage, analysis and open platform. The data storage, analysis and open platform performs further data analysis on these pieces of location information of the UE for application to a variety of industry applications such as transportation planning and marketing analysis. The data storage, analysis and open platform, specially used for storing and analyzing big data, may be independent of an existing mobile communication network and may be a new device superimposed over the mobile communication network. In some other embodiments of the present invention, the RNC may also send the received instruction response information to a data storage, analysis and open platform, and the data storage, analysis and open platform obtains the location information of the UE by means of calculation according to the instruction response information.

After the RNC receives the instruction response information reported by the UE, the RNC sends the received instruction response information to the data storage, analysis and open platform, and the data storage, analysis and open platform obtains the location information of the UE by means of calculation according to the instruction response information of the UE. That is, after the RNC receives the instruction response information of the UE, the data storage, analysis and open platform obtains the location information of the UE by means of calculation; therefore, distributed deployment of devices can be implemented to reduce a performance requirement on a single device, and calculation for the location information of the UE can also be implemented. For example, when the RNC has a limited calculation capability or load balancing needs to be performed, if a large amount of instruction response information reported by the UE is received, the RNC may obtain some location information of the UE by means of calculation, and sends instruction response information beyond a calculation capability of the RNC to the data storage, analysis and open platform, and the data storage, analysis and open platform obtains the other location information of the UE by means of calculation, so that distributed deployment of devices can be implemented.

It should be noted that in this embodiment of the present invention, when the UE is in the Cell FACH state, the Cell PCH state, or the URA PCH state on the UMTS network, because the location information of the UE can be acquired by using the Cell Update message sent by the UE, the location information of the UE can be acquired no matter whether the UE performs a CS domain service or a PS domain service. In another method for collecting location information existing in the prior art, a standard Iu interface message is acquired by disposing a probe on an Iu interface, so as to acquire location information of UE. In this external probe solution, only location information existing when the UE is on a CS domain voice call is collected, and location information existing when the UE performs PS domain data communication cannot be collected. In this embodiment of the present invention, the location information of the UE can be acquired no matter whether the UE performs a CS domain service or a PS domain service.

It can be learned from the foregoing description in this embodiment of the present invention that, because an RNC in this embodiment of the present invention can acquire location information of UE according to a received Cell Update message reported by the UE, and the UE does not need to locate a location of the UE by using a satellite, electricity of the UE may be saved. For a mobile communication network, no matter whether the UE is indoors or outdoors, the Cell Update message reported by the UE can be received provided that a wireless network signal is available. In addition, in this embodiment of the present invention, the location information of the UE can be acquired by using the existing mobile communication network, and the UE does not need to successfully log in to a server by using a specific application program. Therefore, the method for collecting location information provided in this embodiment of the present invention is not limited to an application scenario such as an indoor scenario, an outdoor scenario, or whether an application program is installed; universality is very strong.

It should be noted that when a mobile communication network is a UMTS network, in the foregoing methods for collecting location information that are shown in FIG. 2 to FIG. 4 in the embodiments of the present invention, for signal strength information that is in each cell of the UE and that is included in the measurement report message, the signal strength information that is in each cell of the UE and that is included in the RRC connection request message, and the signal strength information that is in each cell of the UE and that is included in the Cell Update message, the signal strength information is received signal code power (RSCP) information or ratio of energy per modulating bit to the noise spectral density Ec/No (where Ec is energy per chip per code channel after a spectrum is expanded at a transmit end, No is a power spectral density of a band-limited white noise, and a ratio of the Ec and the No is referred to as Ec/No for short) information.

Figure 5:
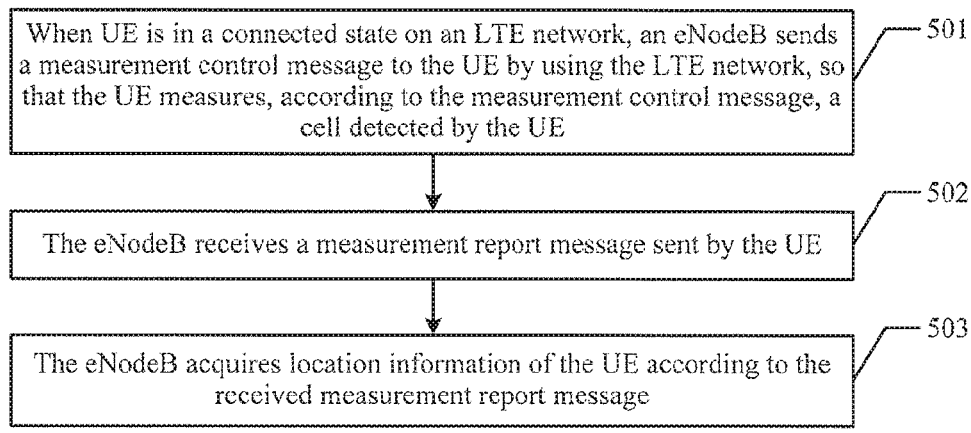
FIG. 5 is a schematic block flowchart of another method for collecting location information according to an embodiment of the present invention.

Referring to FIG. 5, when a mobile communication network is a long term evolution (LTE) network, a method for collecting location information provided in another embodiment of the present invention may include the following steps:

501. When UE is in a connected mode on the LTE network, an evolved NodeB (eNodeB) sends a measurement control message to the UE by using the LTE network, so that the UE measures, according to the measurement control message, a cell detected by the UE.

In this embodiment of the present invention, when the mobile communication network is the LTE network, a device for collecting location information may be the eNodeB. Because the eNodeB and the UE are on the same LTE network, there is a communication connection established between the eNodeB and the UE, so that communication between the eNodeB and the UE may be implemented. The eNodeB delivers the measurement control message to the UE by using the LTE network, and the UE may measure, according to an instruction of the measurement control message, the cell detected by the UE. After measuring, according to the measurement control message, the cell detected by the UE, the UE may generate an ID of a cell in which the UE is located and an ID of a neighboring cell of the cell. When the UE is in the connected mode on the LTE network, the UE generates a measurement report message, and adds, to the measurement report message, the ID of the cell in which the UE is located, the ID of the neighboring cell of the cell, an ID of the UE, and signal strength information in each cell of the UE; then, the UE may send the measurement report message to the eNodeB.

502. The eNodeB receives a measurement report message sent by the UE.

The measurement report message includes the ID of the UE, an ID of the cell detected by the UE, and signal strength information of the cell detected by the UE.

When the UE is in the connected mode on the LTE network, the eNodeB receives, by using the LTE network, the measurement report message sent by the UE. It should be noted that in this embodiment of the present invention, the UE may periodically report the Measurement Report message to the eNodeB, for example, report the Measurement Report message of the UE once every 12 s, and the Measurement Report message may be the instruction response information described in the foregoing embodiment. In addition, the UE also reports the Measurement Report message to the eNodeB when the UE initiates handover, and the Measurement Report message may also be used for location calculation for the UE. Because a piece of longitude and latitude location information of the UE may be obtained by means of calculation according to each Measurement Report message, location movement trail information of the UE may be obtained.

It should be noted that in a mobile communication network whose standard is LTE, because identity information (for example, an IMSI) of the UE cannot be acquired on a radio access network (RAN) side, each piece of location information of the UE needs to be acquired by means of coordination between the RAN side and an evolved packet core (EPC) and by using an S1 application protocol identity (AP ID) as a link of association. After receiving the measurement report message sent by the UE, the eNodeB associates a cell message of the UE with an S1 AP ID of the UE. Then, after acquiring the location information of the UE, the eNodeB forms an association between the location information of the UE and the S1 AP ID of the UE. The EPC may acquire the identity information (for example, an IMSI) of the UE, and forms an association with the S1 AP ID of the UE. Then, the eNodeB obtains, by using the S1 AP ID of the UE, a combination relationship between the location information of the UE and the ID of the UE from the two associations.

503. The eNodeB acquires location information of the UE according to the received measurement report message.

It can be learned from the foregoing description in this embodiment of the present invention that, because an eNodeB in this embodiment of the present invention may deliver a location subscription instruction to UE, and may acquire location information of the UE according to a received measurement report message sent by the UE, and the UE does not need to locate a location of the UE by using a satellite, electricity of the UE may be saved. For a mobile communication network, no matter whether the UE is indoors or outdoors, the measurement report message sent by the UE can be received provided that a wireless network signal is available. In addition, in this embodiment of the present invention, the location information of the UE can be acquired by using the existing mobile communication network, and the UE does not need to successfully log in to a server by using a specific application program. Therefore, the method for collecting location information provided in this embodiment of the present invention is not limited to an application scenario such as an indoor scenario, an outdoor scenario, or whether an application program is installed; universality is very strong.

Figure 6:
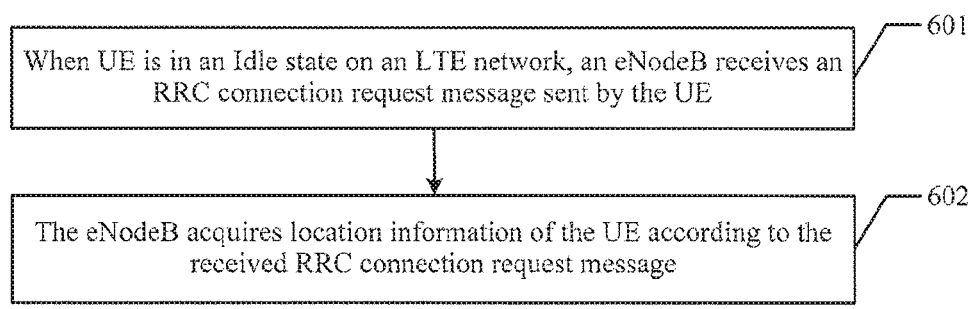
FIG. 6 is a schematic block flowchart of another method for collecting location information according to an embodiment of the present invention.

Referring to FIG. 6, when a mobile communication network is an LTE network, in a method for collecting location information provided in another embodiment of the present invention, receiving instruction response information reported by UE may include the following steps:

601. When the UE is in an idle mode on the LTE network, an eNodeB receives an RRC connection request message sent by the UE.

The RRC connection request message includes an ID of the UE, an ID of a cell detected by the UE, and signal strength information of the cell detected by the UE.

The eNodeB sends a location subscription instruction to the UE by using the LTE network, so that the UE measures, according to the location subscription instruction, the cell detected by the UE.

In this embodiment of the present invention, when the mobile communication network is the LTE network, a device for collecting location information may be the eNodeB. Because the eNodeB and the UE are on the same LTE network, there is a communication connection established between the eNodeB and the UE, so that communication between the eNodeB and the UE may be implemented. When the UE is in the Idle mode on the LTE network, the UE generates the RRC connection request message, and adds, to the RRC connection request message, an ID of a cell in which the UE is located, an ID of a neighboring cell of the cell, the ID of the UE, the ID of the cell detected by the UE, and the signal strength information of the cell detected by the UE; then, the UE may send the RRC connection request message to the eNodeB.

602. The eNodeB acquires location information of the UE according to the received RRC connection request message.

It can be learned from the foregoing description in this embodiment of the present invention that, because an eNodeB in this embodiment of the present invention can acquire location information of UE according to a received RRC connection request message reported by the UE, and the UE does not need to locate a location of the UE by using a satellite, electricity of the UE may be saved. For a mobile communication network, no matter whether the UE is indoors or outdoors, the RRC connection request message reported by the UE can be received provided that a wireless network signal is available. In addition, in this embodiment of the present invention, the location information of the UE can be acquired by using the existing mobile communication network, and the UE does not need to successfully log in to a server by using a specific application program. Therefore, the method for collecting location information provided in this embodiment of the present invention is not limited to an application scenario such as an indoor scenario, an outdoor scenario, or whether an application program is installed; universality is very strong.

It should be noted that when the mobile communication network is the LTE network, in the foregoing methods for collecting location information that are shown in FIG. 5 and FIG. 6 in the embodiments of the present invention, for the signal strength information that is in each cell of the UE and that is included in the measurement report message and the signal strength information that is in each cell of the UE and that is included in the RRC connection request message, the signal strength information is reference signal received power (RSRP) information or reference signal received quality (RSRQ) information.

Figure 7:
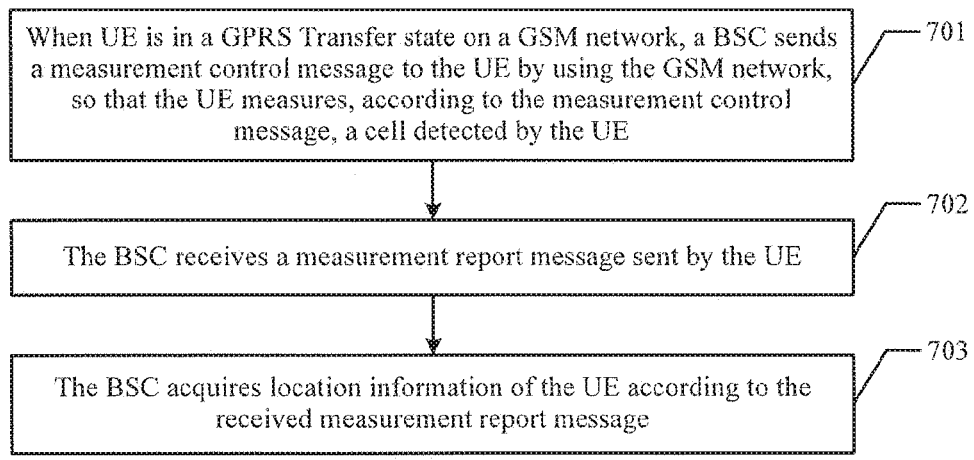
FIG. 7 is a schematic block flowchart of another method for collecting location information according to an embodiment of the present invention.

Referring to FIG. 7, when a mobile communication network is a global system for mobile communications (GSM) network, a method for collecting location information provided in another embodiment of the present invention may include the following steps:

701. When UE is in a general packet radio service transfer (GPRS Transfer) state on the GSM network, a base station controller (BSC) sends a measurement control message to the UE by using the GSM network, so that the UE measures, according to the measurement control message, a cell detected by the UE.

In this embodiment of the present invention, when the mobile communication network is the GSM network, a device for collecting location information may be the BSC. Because the BSC and the UE are on the same GSM network, there is a communication connection established between the BSC and the UE, so that communication between the BSC and the UE may be implemented. The BSC delivers the measurement control message to the UE by using the GSM network, and the UE may measure, according to an instruction of the measurement control message, the cell detected by the UE. After measuring, according to the measurement control message, the cell detected by the UE, the UE may generate an ID of a cell in which the UE is located and an ID of a neighboring cell of the cell. When the UE is in the GPRS Transfer mode on the GSM network, the UE generates a measurement report message, and adds, to the measurement report message, the ID of the cell in which the UE is located, the ID of the neighboring cell of the cell, an ID of the cell detected by the UE, and signal strength information of the cell detected by the UE; then, the UE may send the measurement report message to the BSC.

702. The BSC receives a measurement report message sent by the UE.

The measurement report message includes an ID of the UE, the ID of the cell detected by the UE, and the signal strength information of the cell detected by the UE.

When the UE is in the GPRS Transfer mode on the GSM network, the BSC receives, by using the GSM network, the measurement report message sent by the UE. It should be noted that in this embodiment of the present invention, the UE may periodically report the Measurement Report message to the BSC, for example, report the Measurement Report message of the UE once every 12 s, where the Measurement Report message may be the instruction response information described in the foregoing embodiment. In addition, the UE also reports the Measurement Report message to the BSC when the UE initiates handover, and the Measurement Report message may also be used for location calculation for the UE. Because a piece of longitude and latitude location information of the UE may be obtained by means of calculation according to each Measurement Report message, location movement trail information of the UE may be obtained.

703. The BSC acquires location information of the UE according to the received measurement report message.

It can be learned from the foregoing description in this embodiment of the present invention that, because a BSC in this embodiment of the present invention may deliver a location subscription instruction to UE, and may acquire location information of the UE according to a received measurement report message sent by the UE, and the UE does not need to locate a location of the UE by using a satellite, electricity of the UE may be saved. For a mobile communication network, no matter whether the UE is indoors or outdoors, the measurement report message sent by the UE can be received provided that a wireless network signal is available. In addition, in this embodiment of the present invention, the location information of the UE can be acquired by using the existing mobile communication network, and the UE does not need to successfully log in to a server by using a specific application program. Therefore, the method for collecting location information provided in this embodiment of the present invention is not limited to an application scenario such as an indoor scenario, an outdoor scenario, or whether an application program is installed; universality is very strong.

Figure 8:
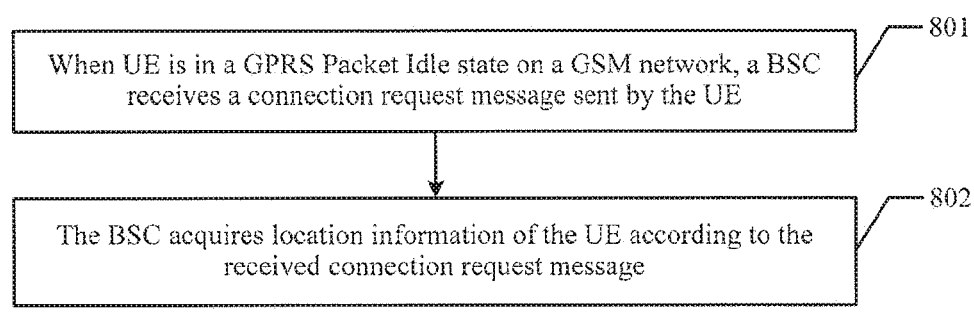
FIG. 8 is a schematic block flowchart of another method for collecting location information according to an embodiment of the present invention.

Referring to FIG. 8, when a mobile communication network is a GSM network, in a method for collecting location information provided in another embodiment of the present invention, receiving instruction response information reported by UE may include the following steps:

801. When the UE is in a GPRS Packet Idle mode on the GSM network, a BSC receives a connection request message sent by the UE.

The connection request message includes an ID of the UE, an ID of a cell in which the UE is located, an ID of a neighboring cell of the cell, and signal strength information in each cell of the UE.

In this embodiment of the present invention, when the mobile communication network is the GSM network, a device for collecting location information may be the BSC. Because the BSC and the UE are on the same GSM network, there is a communication connection established between the BSC and the UE, so that communication between the BSC and the UE may be implemented. When the UE is in the general packet radio service packet idle (GPRS Packet Idle) state on the GSM network, the UE generates the connection request message, and adds, to the connection request message, the ID of the cell in which the UE is located, an ID of a cell detected by the UE, and signal strength information of the cell detected by the UE; then, the UE may send the RRC connection request message to the BSC.

802. The BSC acquires location information of the UE according to the received connection request message.

It can be learned from the foregoing description in this embodiment of the present invention that, because a BSC in this embodiment of the present invention can acquire location information of UE according to a received connection request message reported by the UE, and the UE does not need to locate a location of the UE by using a satellite, electricity of the UE may be saved. For a mobile communication network, no matter whether the UE is indoors or outdoors, the connection request message reported by the UE can be received provided that a wireless network signal is available. In addition, in this embodiment of the present invention, the location information of the UE can be acquired by using the existing mobile communication network, and the UE does not need to successfully log in to a server by using a specific application program. Therefore, the method for collecting location information provided in this embodiment of the present invention is not limited to an application scenario such as an indoor scenario, an outdoor scenario, or whether an application program is installed; universality is very strong.

It should be noted that when the mobile communication network is the GSM network, in the foregoing methods for collecting location information that are shown in FIG. 7 and FIG. 8 in the embodiments of the present invention, for the signal strength information that is in each cell of the UE and that is included in the measurement report message and the signal strength information that is in each cell of the UE and that is included in the RRC connection request message, the signal strength information is received signal strength indicator (RSSI) information.

It should be noted that the embodiments of the present invention are described above in detail by using multiple standards of mobile communication networks shown in FIG. 2 to FIG. 8 as examples. However, the embodiments of the present invention are not limited to the foregoing described UMTS network, LTE network, and GSM network. The method for collecting location information provided in the embodiments of the present invention may also be applied to other network standards of mobile communication networks. For example, the method for collecting location information in the present invention may also be applied to multiple standards of mobile communication networks, such as a Code Division Multiple Access (CDMA) network, a time division-synchronous code division multiple access (TD-SCDMA) network, a worldwide interoperability for microwave access (Wimax) network, and a wireless local area network (WLAN) network. On the CDMA network, the TD-SCDMA network, the Wimax network, and the WLAN network, the location information of the UE may be acquired according to a specific network architecture and a specific protocol manner. The description herein is only for an illustration purpose.

To better understand and implement the foregoing solutions in the embodiments of the present invention, the following provides detailed description by using corresponding application scenarios as examples.

Figure 9:
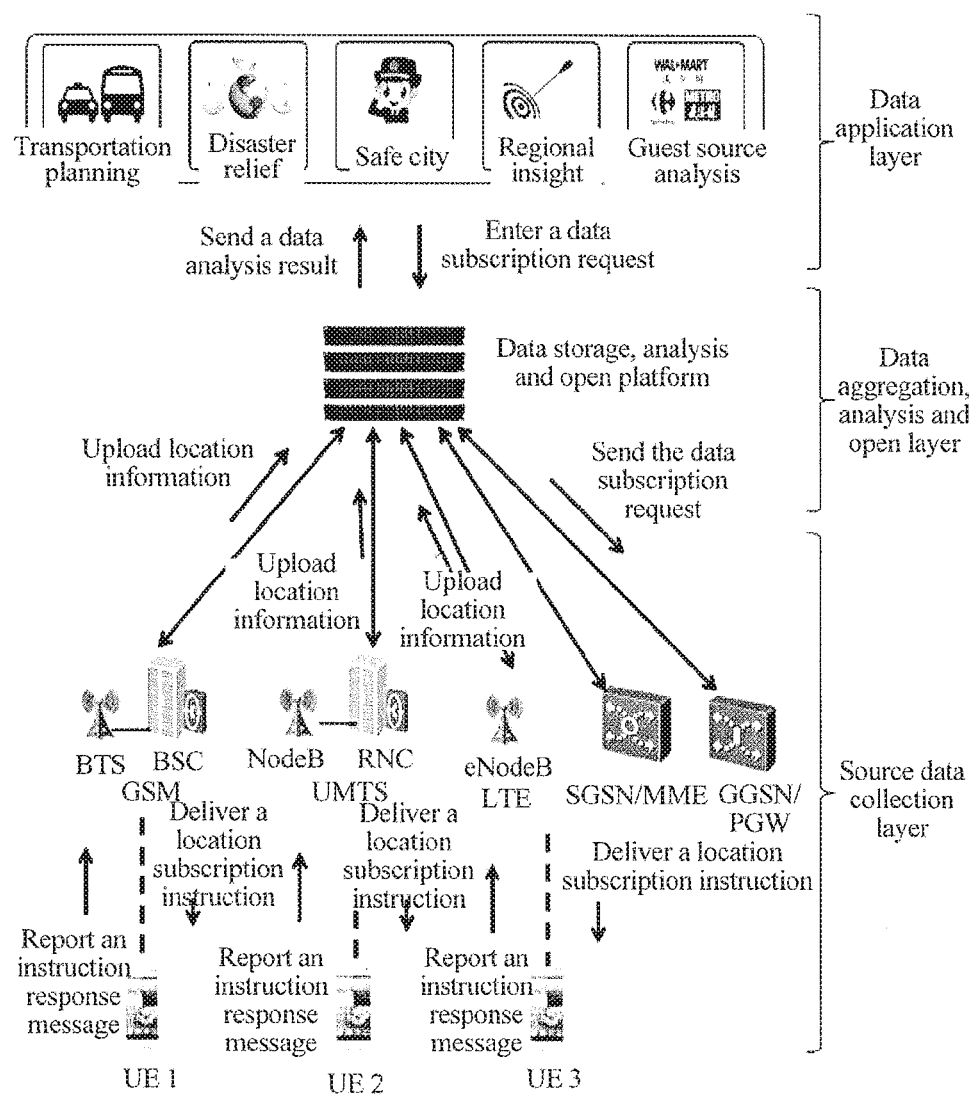
FIG. 9 is a schematic diagram of composition of a network architecture of a system for collecting location information that is implemented according to a method for collecting location information according to an embodiment of the present invention.

Referring to FIG. 9, FIG. 9 is a schematic diagram of composition of a network architecture of a system for collecting location information that is implemented according to a method for collecting location information according to an embodiment of the present invention. The following illustrative description is made as a process of data subscription, collection and reporting.

The network architecture of the system for collecting location information that is implemented according to the method for collecting location information and that is provided in this embodiment of the present invention is divided into three layers: a source data collection layer, a data aggregation, analysis and open layer, and a data application layer. The source data collection layer includes network elements and UE on a mobile communication network. FIG. 9 shows a UMTS network, an LTE network, a GSM network, a serving GPRS support node (SGSN)/mobility management entity (MME), a gateway GPRS support node (GGSN)/packet data network gateway (PGW), and UE 1, UE 2, and UE 3 on different mobile communication networks. The GSM network includes a base transceiver station (BTS) and a BSC. The UMTS network includes a NodeB (Node B) and an RNC. The data aggregation, analysis and open layer includes a data storage, analysis and open platform. The data storage, analysis and open platform is independent of the GSM network, the UMTS network, and the LTE network, and is a new device superimposed over each mobile communication network. The data storage, analysis and open platform analyzes location information of the UE reported on each mobile communication network. The data application layer includes a third-party application server used in various industries and fields, for example, used in multiple third-party applications such as transportation planning, disaster relief, safe city, regional insight, and guest source analysis.

Figure 10:
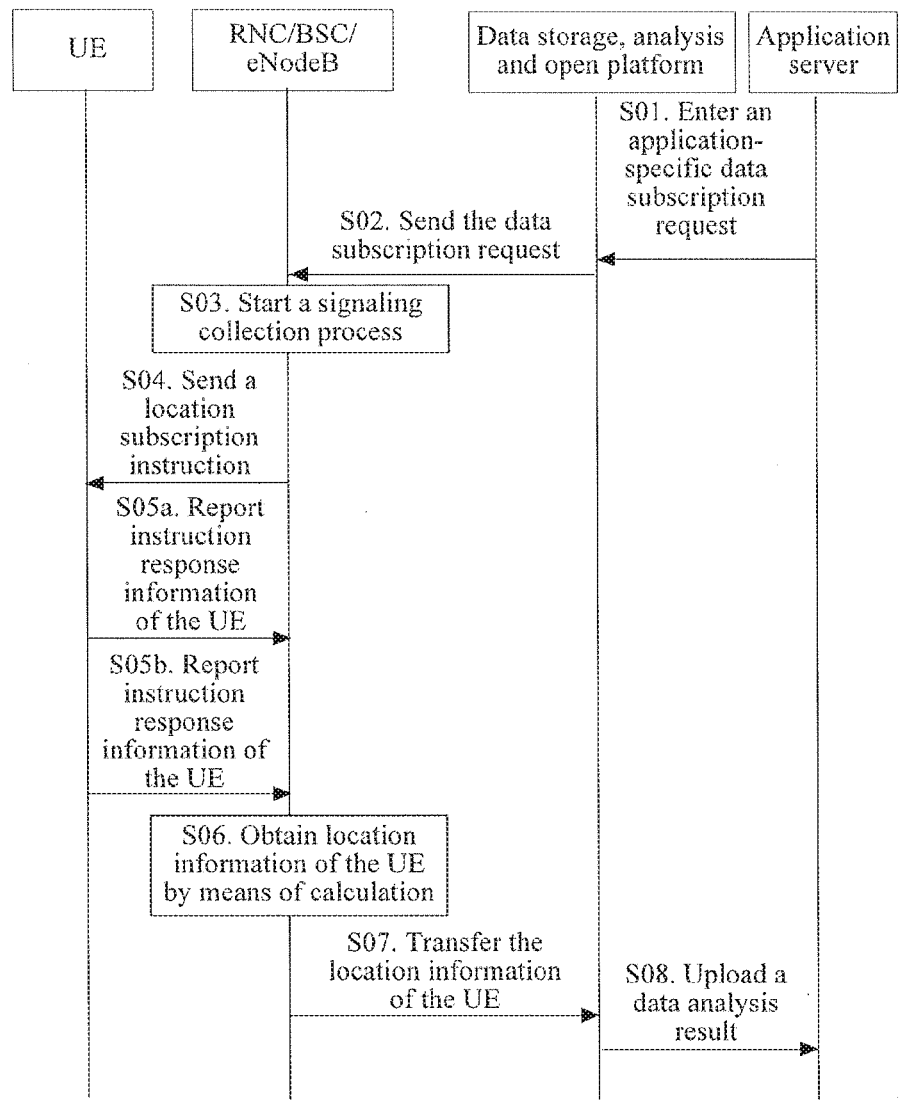
FIG. 10 is a schematic diagram of work processes of components in a system for collecting location information according to an embodiment of the present invention.

The following describes a work process of each component in the system for collecting location information provided in this embodiment of the present invention. Referring to FIG. 10, FIG. 10 is a schematic diagram of a work process of each component in a system for collecting location information according to an embodiment of the present invention, and the process mainly includes the following steps:

S01. A third-party application server enters an application-specific data subscription request into a data storage, analysis and open platform according to a requirement of the third-party application server, so as to request for location information data of a user.

S02. The data storage, analysis and open platform sends, according to the request of the application server, the data subscription request to a device for collecting location information, where an example in which the device for collecting location information refers to a network element on a mobile communication network is used for description, and each network element on the mobile communication network receives the data subscription request sent by the data storage, analysis and open platform, so as to subscribes to radio signaling required for locating a location of the user.

S03. Each network element on the mobile communication network starts a signaling collection process, that is, a network element on a radio access network (RAN) side starts an information collection process, where for a GSM network, the network element on the RAN side refers to a BSC; for a UMTS network, the network element on the RAN side refers to an RNC; and for an LTE network, the network element on the RAN side refers to an eNodeB.

S04. The network element on the RAN side delivers a location subscription instruction to UE, so as to instruct the UE to periodically measure a cell detected by the UE.

S05a. The UE reports instruction response information of the UE, where the instruction response information includes an ID of the UE, an ID of the cell detected by the UE, and signal strength information of the cell detected by the UE.

S05b. The UE reports instruction response information of the UE again according to a measurement period.

S06. The network element on the RAN side obtains location information of the UE by means of calculation according to the instruction response information reported by the UE.

S07. The network element on the RAN side reports the location information of the UE to the data storage, analysis and open platform.

S08. The data storage, analysis and open platform stores and analyzes the location information of the UE, provides an external digital footprint file that includes the location information of the UE, and uploads a data analysis result to the application server, so as to implement responding to the request of the application server. After obtaining the digital footprint file from the data storage, analysis and open platform, the third-party application server applies the information to industry analysis.

It should be noted that as described above, step S06 is described by using an example in which the network element on the RAN side obtains the location information of the UE by means of calculation. In some other embodiments of the present invention, after the network element on the RAN side receives the instruction response information reported by the UE, the network element on the RAN side may further directly upload a cell message of the UE to the data storage, analysis and open platform, and the data storage, analysis and open platform obtains the location information of the UE by means of calculation. Specifically, in some embodiments of the present invention, after obtaining a location of the UE by means of calculation, the data aggregation, analysis and open layer outputs a data analysis result to the data application layer, where as shown in Table 1, the data analysis result may include the following fields:

| Field | Description |
| --- | --- |
| User ID | Anonymized UE ID, for example, an anonymized IMSI |
| Timestamp | Timestamp |
| Longitude | Longitude |
| Latitude | Latitude |
| BSC/RNC/eNodeB ID | ID of a network element in which the UE is located |
| Cell ID | ID of a cell in which the UE is located |
| Indoor | Indoor or outdoor identity: the UE is indoors or outdoors |
| Confidence | Confidence: a probability of a location within an area range, or location precision |
| RAT Type | RAT type: GSM, UMTS, LTE, and the like |
| Location Type | Location type: feature matching, Cell ID + RTT location, AGPS location, and quick location |
| User Status | User in/out-zone (Zone) status: initial status, user in ZoneId, user out ZoneId, and movement within a same Zone |
| IMSI code | Country code of an IMSI |
| UE Status | UE status | where the RAT refers to radio access, and is Radio Access Technology in full spelling.

In addition, in the foregoing embodiment, the example in which the device for collecting location information refers to the network element on the RAN side is used for description, and then an example in which the network element on the RAN side performs steps S03, S04, and S06 is used for description, where the network element on the RAN side refers to the RNC/BSC/eNodeB. The RNC is used as an example. The RNC receives the data subscription request sent by the data storage, analysis and open platform; the RNC delivers a data subscription instruction to the UE; and the RNC obtains the location information of the UE by means of calculation according to the instruction response information reported by the UE. In some embodiments of the present invention, that the device for collecting location information is the RNC indicates that the device for collecting location information is a unit of the RNC. As a unit module inside the RNC, the device for collecting location information is configured to receive the data subscription request sent by the data storage, analysis and open platform, deliver the data subscription instruction to the UE, and obtain the location information of the UE by means of calculation according to the instruction response information reported by the UE. Similarly, that the device for collecting location information is the BSC/eNodeB indicates that the device for collecting location information is a unit module of the BSC/eNodeB. As a unit module inside the BSC/eNodeB, the device for collecting location information is configured to receive the data subscription request sent by the data storage, analysis and open platform, deliver the data subscription instruction to the UE, and obtain the location information of the UE by means of calculation according to the instruction response information reported by the UE.

There may be multiple specific implementation manners of the device for collecting location information on the mobile communication network in this embodiment of the present invention. The following describes, by using examples, implementation manners of devices for collecting location information on the GSM network and the UMTS network.

Referring to FIG. 11-a, the device for collecting location information is not built inside the RNC/BSC, but is used as an independent external unit module. There is a communications interface between a device A for collecting location information (a device A shown in the figure) and the BSC; there is a communications interface between a device B for collecting location information (a device B shown in the figure) and the RNC. Both the device A for collecting location information and the device B for collecting location information are configured to deliver a location subscription instruction to the UE and receive instruction response information reported by the UE. The RNC/BSC is separately externally connected to one device for collecting location information.

Referring to FIG. 11-b, the device for collecting location information is not built inside the RNC/BSC, but is used as an independent external unit module. There is a communications interface between the device for collecting location information and the RNC and a communications interface between the device for collecting location information and the BSC. The device for collecting location information is configured to deliver a location subscription instruction to the UE and receive instruction response information reported by the UE. The RNC/BSC are jointly externally connected to the same device for collecting location information.

Referring to FIG. 11-c, the device for collecting location information is not built inside the RNC/BSC, but is used as an independent external unit module. A device A for collecting location information (a device A shown in the figure) is deployed between a BTS and the BSC, and the device A for collecting location information has two communications interfaces that are separately connected to the BTS and the BSC. A device B for collecting location information (a device B shown in the figure) is deployed between a NodeB and the RNC, and the device B for collecting location information has two communications interfaces that are separately connected to the NodeB and the RNC. Both the device A for collecting location information and the device B for collecting location information are configured to deliver a location subscription instruction to the UE and receive instruction response information reported by the UE.

Referring to FIG. 11-d, the device for collecting location information is deployed inside the data storage, analysis and open platform, and is a unit module in the data storage, analysis and open platform. There is a communications interface between the device for collecting location information and the RNC, and a communications interface between the device for collecting location information and the BSC. The device for collecting location information is configured to deliver a location subscription instruction to the UE and receive instruction response information reported by the UE. The RNC/BSC is separately externally connected to the same device for collecting location information.

Referring to FIG. 11-*e*, the device for collecting location information is not built inside the RNC/BSC, but is used as an independent external unit module. There is a communications interface between a device A for collecting location information (a device A shown in the figure) and the BSC; there is a communications interface between a device B for collecting location information (a device B shown in the figure) and the RNC. Both the device A for collecting location information and the device B for collecting location information are configured to deliver a location subscription instruction to the UE and receive instruction response information reported by the UE. The RNC/BSC is separately externally connected to one device for collecting location information. There is a communications interface between devices for collecting location information that are between different RNCs, between different BSCs, or between different RNC and BSC, and may transfer signaling data to each other. When a processing capability of a device for collecting location information on an RNC or a BSC is overloaded, signaling that cannot be processed due to overload may be transferred to the other device for collecting location information, and the other device for collecting location information processes the signaling, which may implement load balancing.

Referring to FIG. 11-*f*, the device for collecting location information is not built inside the RNC/BSC, but is used as an independent external unit module. There is a communications interface between a device A for collecting location information (a device A shown in the figure) and the BSC; there is a communications interface between a device B for collecting location information (a device B shown in the figure) and the RNC. Both the device A for collecting location information and the device B for collecting location information are configured to deliver a location subscription instruction to the UE and receive instruction response information reported by the UE. The RNC/BSC is separately externally connected to one device for collecting location information. There is a communications interface between a device C for collecting location information (a device C shown in the figure) deployed on the data storage, analysis and open platform and a device for collecting location information that is between different RNCs, between different BSCs, or between different RNC and BSC, so that signaling data may be transferred between the devices. When a processing capability of a device for collecting location information on an RNC or a BSC is overloaded, signaling that cannot be processed due to overload may be transferred to the other device for collecting location information, and the other device for collecting location information processes the signaling, which may implement load balancing.

It can be learned from the description in this embodiment of the present invention that, in this embodiment of the present invention, location information of users on an entire network may be collected and acquired by using a mobile communication network, and may be adjusted by controlling both frequency of generating signaling and impact on network load can be controlled and according to an application requirement. Then, digital footprint information is opened by providing a standard interface, so as to support various commercial applications of an operator and a third party. Various industry applications such as transportation planning and market analysis may be implemented according to digital footprint information of users. In this embodiment of the present invention, the digital footprint information that includes the location information of the users can be collected. The method for collecting location information provided in this embodiment of the present invention has the following advantages: 1. high user and geographic range coverage; 2. high precision; 3. low deployment costs; 4. a wide range of data sources that can be acquired; 5. better protecting user privacy by using a credit limit and a security mechanism of an operator; and 6. better supporting multiple applications by using a uniform data storage and analysis platform of the operator, thereby reducing a development period and development costs of a location application.

It should be noted that for brief description, the foregoing method embodiments are described as a series of action combinations. However, persons skilled in the art should understand that the present invention is not limited to the described order of the actions, because according to the present invention, some steps may be performed in another order or simultaneously. In addition, persons skilled in the art should also understand that all embodiments described in this specification belong to exemplary embodiments, and the involved actions and modules are not necessarily required in the present invention.

To better implement the foregoing solutions in the embodiments of the present invention, the following further provides a relevant apparatus configured to implement the foregoing solutions.

Referring to FIG. 12-*a*, a device 1200 for collecting location information provided in an embodiment of the present invention may include an instruction sending module 1201, an information receiving module 1202, and a location information acquiring module 1203, where the instruction sending module 1201 is configured to send a location subscription instruction to user equipment UE by using a mobile communication network, where the location subscription instruction includes: instructing the UE to measure a cell detected by the UE;

the information receiving module 1202 is configured to receive instruction response information reported by the UE, where the instruction response information includes an ID of the UE, an ID of the cell detected by the UE, and signal strength information of the cell detected by the UE; and the location information acquiring module 1203 is configured to acquire location information of the UE according to the received instruction response information.

In some embodiments of the present invention, the mobile communication network is a Universal Mobile Telecommunications System (UMTS) network, and when the UE is in a cell-dedicated channel Cell DCH state on the UMTS network, the device for collecting location information is a radio network controller RNC;

the instruction sending module 1201 is configured to send a measurement control message to the UE by using the UMTS network, so that the UE measures, according to the measurement control message, the cell detected by the UE; and the information receiving module 1202 is configured to receive a measurement report message sent by the UE, where the measurement report message includes the ID of the UE, the ID of the cell detected by the UE, and the signal strength information of the cell detected by the UE.

In some embodiments of the present invention, the mobile communication network is a UMTS network, and the device for collecting location information is a radio network controller RNC; and the information receiving module 1202 is configured to: when the UE is in an idle mode on the UMTS network, receive a radio resource control (RRC) connection request message sent by the UE, where the RRC connection request message includes the ID of the UE, the ID of the cell detected by the UE, and the signal strength information of the cell detected by the UE.

In some embodiments of the present invention, the mobile communication network is a UMTS network, and the device for collecting location information is a radio network controller RNC; and the information receiving module 1202 is configured to: when the UE is in a cell-forward access channel Cell FACH state, a cell paging channel Cell PCH state, or a Universal Mobile Telecommunications System terrestrial radio access network registration area paging channel URA PCH state on the UMTS network, receive a cell update message sent by the UE, where the cell update message includes the ID of the UE, an ID of a cell in which the UE is located, the ID of the cell detected by the UE, and the signal strength information of the cell detected by the UE.

In some embodiments of the present invention, the signal strength information received by the information receiving module 1202 is received signal code power RSCP information or ratio of energy per modulating bit to the noise spectral density Ec/No information.

In some embodiments of the present invention, the mobile communication network is a Long Term Evolution LTE network, and when the UE is in a connected mode on the LTE network, the device for collecting location information is an evolved NodeB eNodeB;

the instruction sending module 1201 is configured to send a measurement control message to the UE by using the LTE network, so that the UE measures, according to the measurement control message, the cell detected by the UE; and the information receiving module 1202 is configured to receive a measurement report message sent by the UE, where the measurement report message includes the ID of the UE, the ID of the cell detected by the UE, and the signal strength information of the cell detected by the UE.

In some embodiments of the present invention, the mobile communication network is an LTE network, and the device for collecting location information is an evolved NodeB eNodeB; and the information receiving module 1202 is configured to: when the UE is in an idle mode on the LTE network, receive an RRC connection request message sent by the UE, where the RRC connection request message includes an S1AP ID of the UE, an ID of a cell in which the UE is located, the ID of the cell detected by the UE, and the signal strength information of the cell detected by the UE.

In some embodiments of the present invention, the signal strength information received by the information receiving module 1202 is reference signal received power RSRP information or reference signal received quality RSRQ information.

In some embodiments of the present invention, the mobile communication network is a Global System for Mobile Communications GSM network, and when the UE is in a general packet radio service transfer GPRS Transfer mode on the GSM network, the device for collecting location information is a base station controller BSC;

the instruction sending module 1201 is configured to send a measurement control message to the UE by using the GSM network, so that the UE measures, according to the measurement control message, the cell detected by the UE; and the information receiving module 1202 is configured to receive a measurement report message sent by the UE, where the measurement report message includes the ID of the UE, the ID of the cell detected by the UE, and the signal strength information of the cell detected by the UE.

In some embodiments of the present invention, the mobile communication network is a GSM network, and the device for collecting location information is a base station controller BSC; and the information receiving module 1202 is configured to: when the UE is in a general packet radio service packet idle GPRS Packet Idle mode on the GSM network, receive an RRC connection request message sent by the UE, where the RRC connection request message includes the ID of the UE, the ID of the cell detected by the UE, and the signal strength information of the cell detected by the UE.

In some embodiments of the present invention, the signal strength information received by the information receiving module 1202 is received signal strength indicator RSSI information.

In some embodiments of the present invention, compared with the device 1200 for collecting location information shown in FIG. 12-*a*, referring to FIG. 12-*b*, the device 1200 for collecting location information further includes an encryption module 1204, configured to: after the location information acquiring module receives the instruction response information reported by the UE, encrypt the ID that is of the UE and that is included in the instruction response information, to obtain an anonymous identity, where the anonymous identity is in a one-to-one correspondence with the ID of the UE.

In some embodiments of the present invention, the ID that is of the UE and that is included in the instruction response information received by the information receiving module 1202 is an international mobile subscriber identity IMSI.

In some embodiments of the present invention, the location subscription instruction sent by the instruction sending module 1201 includes: instructing the UE to measure, according to a preconfigured measurement period, the cell detected by the UE;

the information receiving module 1202 is configured to receive multiple pieces of instruction response information reported by the UE according to the preconfigured measurement period; and the location information acquiring module 1203 is configured to obtain location movement information of the UE by means of calculation according to the multiple pieces of received instruction response information.

In some embodiments of the present invention, the location information acquiring module 1203 is configured to send the received instruction response information to a data storage, analysis and open platform, and the data storage, analysis and open platform obtains the location information of the UE by means of calculation according to the instruction response information.

In this embodiment of the present invention, first, an instruction sending module sends a location subscription instruction to UE by using a mobile communication network, to instruct the UE to measure, according to the location subscription instruction, a cell detected by the UE; after the UE generates, according to the location subscription instruction, an ID of the cell detected by the UE and signal strength information of the cell detected by the UE, instruction response information reported by the UE is received, where the instruction response information includes an ID of the UE, the ID of the cell detected by the UE, and the signal strength information of the cell detected by the UE; finally, a location information acquiring module may acquire location information of the UE according to the received instruction response information. In this embodiment of the present invention, because a location subscription instruction may be delivered to UE, location information of the UE may be acquired according to received instruction response information reported by the UE, and the UE does not need to locate a location of the UE by using a satellite, electricity of the UE may be saved. For a mobile communication network, no matter whether the UE is indoors or outdoors, the instruction response information reported by the UE can be received provided that a wireless network signal is available. In addition, in this embodiment of the present invention, the location information of the UE can be acquired by using the existing mobile communication network, and the UE does not need to successfully log in to a server by using a specific application program; therefore, a problem of application program promotion does not exist. Therefore, the method for collecting location information provided in this embodiment of the present invention is not limited to an application scenario such as an indoor scenario, an outdoor scenario, or whether an application program is installed; universality is very strong.

An embodiment of the present invention further provides a computer storage medium, where the computer storage medium stores a program and the program performs some or all of steps described in the foregoing method embodiments.

The following describes another device for collecting location information provided in an embodiment of the present invention. Referring to FIG. 13, a device 1300 for collecting location information includes:

an input apparatus 1301, an output apparatus 1302, a processor 1303, and a memory 1304 (there may be one or more processors 1303 in the device 1300 for collecting location information, and one processor is used as an example in FIG. 13). In some embodiments of the present invention, the input apparatus 1301, the output apparatus 1302, the processor 1303, and the memory 1304 may be connected by using a bus or in another manner. In FIG. 13, a bus connection is used as an example.

The memory 1304 is configured to store an instruction and code.

The processor 1303 is configured to perform the following steps:

sending a location subscription instruction to user equipment UE by using a mobile communication network, where the location subscription instruction includes: instructing the UE to measure a cell detected by the UE;

receiving instruction response information reported by the UE, where the instruction response information includes an ID of the UE, an ID of the cell detected by the UE, and signal strength information of the cell detected by the UE; and acquiring location information of the UE according to the received instruction response information.

In some embodiments of the present invention, the mobile communication network is a Universal Mobile Telecommunications System (UMTS) network, and when the UE is in a cell-dedicated channel Cell DCH state on the UMTS network, the processor 1303 is configured to perform the following steps:

sending a measurement control message to the UE by using the UMTS network, so that the UE measures, according to the measurement control message, the cell detected by the UE; and receiving a measurement report message sent by the UE, where the measurement report message includes the ID of the UE, the ID of the cell detected by the UE, and signal strength information of the cell detected by the UE.

In some embodiments of the present invention, the mobile communication network is a UMTS network, and the processor 1303 is configured to perform the following step:

when the UE is in an idle mode on the UMTS network, receiving a radio resource control (RRC) connection request message sent by the UE, where the RRC connection request message includes the ID of the UE, an ID of a cell in which the UE is located, the ID of the cell detected by the UE, and the signal strength information of the cell detected by the UE.

In some embodiments of the present invention, the mobile communication network is a UMTS network, and the processor 1303 is configured to perform the following step:

when the UE is in a cell-forward access channel (Cell FACH) state, a cell paging channel (Cell PCH) state, or a universal mobile telecommunications system terrestrial radio access network registration area paging channel (URA PCH) state on a UMTS network, receiving a cell update message sent by the UE, where the cell update message includes the ID of the UE, the ID of the cell detected by the UE, and the signal strength information of the cell detected by the UE.

In some embodiments of the present invention, the signal strength information received by the processor 1303 is received signal code power RSCP information or ratio of energy per modulating bit to the noise spectral density Ec/No information.

In some embodiments of the present invention, the mobile communication network is a Long Term Evolution LTE network, and when the UE is in a connected mode on the LTE network, the processor 1303 is configured to perform the following steps: sending a measurement control message to the UE by using the LTE network, so that the UE measures, according to the measurement control message, the cell detected by the UE; and receiving a measurement report message sent by the UE, where the measurement report message includes an S1 Application Protocol identity AP ID of the UE, an ID of a cell in which the UE is located, the ID of the cell detected by the UE, and the signal strength information of the cell detected by the UE.

In some embodiments of the present invention, the mobile communication network is an LTE network, and the processor 1303 is configured to perform the following step: when the UE is in an idle mode on the LTE network, receiving an RRC connection request message sent by the UE, where the RRC connection request message includes an S1AP ID of the UE, an ID of a cell in which the UE is located, the ID of the cell detected by the UE, and the signal strength information of the cell detected by the UE.

In some embodiments of the present invention, the signal strength information received by the processor 1303 is reference signal received power RSRP information or reference signal received quality RSRQ information.

In some embodiments of the present invention, the mobile communication network is a Global System for Mobile Communications GSM network, and when the UE is in a general packet radio service transfer GPRS Transfer mode on the GSM network, the processor 1303 is configured to perform the following steps: sending a measurement control message to the UE by using the GSM network, so that the UE measures, according to the measurement control message, the cell detected by the UE; and receiving a measurement report message sent by the UE, where the measurement report message includes the ID of the UE, an ID of a cell in which the UE is located, the ID of the cell detected by the UE, and the signal strength information of the cell detected by the UE.

In some embodiments of the present invention, the mobile communication network is a GSM network, and the processor 1303 is configured to perform the following step: when the UE is in a general packet radio service packet idle GPRS Packet Idle mode on the GSM network, receiving a connection request message sent by the UE, where the connection request message includes the ID of the UE, the ID of the cell detected by the UE, and the signal strength information of the cell detected by the UE.

In some embodiments of the present invention, the signal strength information received by the processor 1303 is received signal strength indicator RSSI information.

In some embodiments of the present invention, the processor 1303 is further configured to perform the following step: after receiving the instruction response information reported by the UE, encrypting the ID that is of the UE and that is included in the instruction response information, to obtain an anonymous identity, where the anonymous identity is in a one-to-one correspondence with the ID of the UE.

In some embodiments of the present invention, the ID that is of the UE and that is included in the instruction response information received by the processor 1303 is an international mobile subscriber identity IMSI.

In some embodiments of the present invention, the location subscription instruction includes: instructing the UE to measure, according to a preconfigured measurement period, the cell detected by the UE; and the processor 1303 is configured to perform the following steps: receiving multiple pieces of instruction response information reported by the UE according to the preconfigured measurement period; and obtaining location movement information of the UE by means of calculation according to the multiple pieces of received instruction response information.

In some embodiments of the present invention, the processor 1303 is configured to perform the following step: sending the received instruction response information to a data storage, analysis and open platform, and the data storage, analysis and open platform obtains the location information of the UE by means of calculation according to the instruction response information.

In this embodiment of the present invention, first, a location subscription instruction is sent to UE by using a mobile communication network, so as to instruct the UE to measure, according to the location subscription instruction, a cell detected by the UE; after the UE generates, according to the location subscription instruction, an ID of the cell detected by the UE and signal strength information of the cell detected by the UE, instruction response information reported by the UE is received, where the instruction response information includes an ID of the UE, the ID of the cell detected by the UE, and the signal strength information of the cell detected by the UE; finally, location information of the UE may be acquired according to the received instruction response information. In this embodiment of the present invention, because a location subscription instruction may be delivered to UE, location information of the UE may be acquired according to received instruction response information reported by the UE, and the UE does not need to locate a location of the UE by using a satellite, electricity of the UE may be saved. For a mobile communication network, no matter whether the UE is indoors or outdoors, the instruction response information reported by the UE can be received provided that a wireless network signal is available. In addition, in this embodiment of the present invention, the location information of the UE can be acquired by using the existing mobile communication network, and the UE does not need to successfully log in to a server by using a specific application program; therefore, a problem of application program promotion does not exist. Therefore, the method for collecting location information provided in this embodiment of the present invention is not limited to an application scenario such as an indoor scenario, an outdoor scenario, or whether an application program is installed; universality is very strong.

In addition, it should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided by the present invention, connection relationships between modules indicate that the modules have communication connections with each other, which may be implemented as one or more communications buses or signal cables. Persons of ordinary skill in the art may understand and implement the embodiments of the present invention without creative efforts.

Based on the description of the foregoing implementation manners, persons skilled in the art may clearly understand that the present invention may be implemented by software in addition to necessary universal hardware, or by dedicated hardware, including an application-specific integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation manner in most cases. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present invention.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for collecting location information, comprising:

sending, by a device for collecting location information, a location subscription instruction to a terminal by using a mobile communication network, wherein the location subscription instruction instructs the terminal to measure a cell detected by the terminal;

receiving, by the device, instruction response information reported by the terminal, wherein the instruction response information comprises an identity (ID) of the terminal, an ID of the cell detected by the terminal, and signal strength information of the cell detected by the terminal;

encrypting, by the device, the ID of the terminal to obtain an anonymous identity, wherein the anonymous identity is in a one-to-one correspondence with the ID of the terminal; and sending, by the device, the instruction response information to a data storage, analysis and open platform to cause the data storage, analysis and open platform to obtain the location information of the terminal by performing calculation according to the instruction response information.

2. The method according to claim 1, wherein the mobile communication network is a universal mobile telecommunications system (UMTS) network, and when the terminal is in a cell-dedicated channel (Cell DCH) state on the UMTS network, the sending a location subscription instruction to terminal by using a mobile communication network comprises: sending, by a radio network controller (RNC), a measurement control message to the terminal by using the UMTS network; and the receiving instruction response information reported by the terminal comprises: receiving, by the RNC, a measurement report message sent by the terminal, wherein the measurement report message comprises the ID of the terminal, the ID of the cell detected by the terminal, and the signal strength information of the cell detected by the terminal.

3. The method according to claim 1, wherein the receiving instruction response information reported by the terminal comprises:

when the terminal is in an idle mode on a UMTS network, receiving, by an RNC, a radio resource control (RRC) connection request message sent by the terminal, wherein the RRC connection request message comprises the ID of the terminal, the ID of the cell detected by the terminal, and the signal strength information of the cell detected by the terminal.

4. The method according to claim 1, wherein the receiving instruction response information reported by the terminal comprises:

when the terminal is in a cell-forward access channel (Cell FACH) state, a cell paging channel (Cell PCH) state, or a universal mobile telecommunications system terrestrial radio access network registration area paging channel (URA PCH) state on a UMTS network, receiving, by an RNC, a cell update (Cell Update) message sent by the terminal, wherein the Cell Update message comprises the ID of the terminal, the ID of the cell detected by the terminal, and the signal strength information of the cell detected by the terminal.

5. The method according to claim 2, wherein the signal strength information is received signal code power (RSCP) information or ratio of energy per modulating bit to the noise spectral density (Ec/No) information.

6. The method according to claim 1, wherein the mobile communication network is a Long Term Evolution (LTE) network, and when the terminal is in a connected mode on the LTE network, and the sending a location subscription instruction to a terminal by using a mobile communication network comprises:

sending, by an eNodeB, a measurement control message to the terminal by using the LTE network; and the receiving instruction response information reported by the terminal comprises:

receiving, by the eNodeB, a measurement report message sent by the terminal, wherein the measurement report message comprises the ID of the terminal, the ID of the cell detected by the terminal, and the signal strength information of the cell detected by the terminal.

7. The method according to claim 1, wherein the receiving instruction response information reported by the terminal comprises:

when the terminal is in an idle mode on a Long Term Evolution (LTE) network, receiving, by an eNodeB, an RRC connection request message sent by the terminal, wherein the RRC connection request message comprises the ID of the terminal, the ID of the cell detected by the terminal, and the signal strength information of the cell detected by the terminal.

8. The method according to claim 6, wherein the signal strength information is reference signal received power (RSRP) information or reference signal received quality (RSRQ) information.

9. The method according to claim 1, wherein the mobile communication network is a global system for mobile communications (GSM) network, and when the terminal is in a general packet radio service transfer (GPRS Transfer) state on the GSM network, the sending a location subscription instruction to a terminal by using a mobile communication network comprises:

sending, by a base station controller (BSC), a measurement control message to the terminal by using the GSM network; and the receiving instruction response information reported by the terminal comprises:

receiving, by the BSC, a measurement report message sent by the terminal, wherein the measurement report message comprises the ID of the terminal, the ID of the cell detected by the terminal, and the signal strength information of the cell detected by the terminal.

10. The method according to claim 1, wherein the receiving instruction response information reported by the terminal comprises:

when the terminal is in a general packet radio service packet idle (GPRS Packet Idle) mode on a GSM network, receiving, by a BSC, a connection request message sent by the terminal, wherein the connection request message comprises the ID of the terminal, the ID of the cell detected by the terminal, and the signal strength information of the cell detected by the terminal.

11. A device for collecting location information, comprising:

a transmitter, configured to send a location subscription instruction to a terminal by using a mobile communication network, wherein the location subscription instruction instructs the terminal to measure a cell detected by the terminal;

a receiver, configured to receive instruction response information from the terminal, wherein the instruction response information comprises an identity (ID) of the terminal, an ID of the cell detected by the terminal, and signal strength information of the cell detected by the terminal; and a processor, configured to:
encrypt the ID of the terminal to obtain an anonymous identity, wherein the anonymous identity is in a one-to-one correspondence with the ID of the terminal; and
send the instruction response information to a data storage, analysis and open platform to cause the data storage, analysis and open platform to obtain the location information of the terminal according to the instruction response information.

12. The device according to claim 11, wherein
the mobile communication network is a universal mobile telecommunications system (UMTS) network, and when the terminal is in a cell-dedicated channel (Cell DCH) state on the UMTS network, the device for collecting location information is a radio network controller (RNC);
the transmitter is configured to send a measurement control message to the terminal by using the UMTS network; and
the receiver is configured to receive a measurement report message from the terminal, wherein the measurement report message comprises the ID of the terminal, the ID of the cell detected by the terminal, and the signal strength information of the cell detected by the terminal.

13. The device according to claim 11, wherein the mobile communication network is a UMTS network, and the device for collecting location information is a radio network controller (RNC); and
the receiver is configured to: when the terminal is in an idle mode on the UMTS network, receive a radio resource control (RRC) connection request message from the terminal, wherein the RRC connection request message comprises the ID of the terminal, the ID of the cell detected by the terminal, and the signal strength information of the cell detected by the terminal.

14. The device according to claim 11, wherein the mobile communication network is a UMTS network, and the device for collecting location information is a radio network controller (RNC); and
the receiver is configured to: when the terminal is in a cell-forward access channel (Cell FACH) state, a cell paging channel (Cell PCH) state, or a universal mobile telecommunications system terrestrial radio access network registration area paging channel (URA PCH) state on the UMTS network, receive a cell update message from the terminal, wherein the cell update message comprises the ID of the terminal, the ID of the cell detected by the terminal, and the signal strength information of the cell detected by the terminal.

15. The device according to a claim 11, wherein the signal strength information is received signal code power (RSCP) information or ratio of energy per modulating bit to the noise spectral density (Ec/No) information.

16. The device according to claim 11, wherein
the mobile communication network is a Long Term Evolution (LTE) network, and when the terminal is in a connected mode on the LTE network, the device for collecting location information is an eNodeB;
the transmitter is configured to send a measurement control message to the terminal by using the LTE network; and
the receiver is configured to receive a measurement report message from the terminal, wherein the measurement report message comprises the ID of the terminal, the ID of the cell detected by the terminal, and the signal strength information of the cell detected by the terminal.

17. The device according to claim 11, wherein
the mobile communication network is a Long Term Evolution (LTE) network, and the device for collecting location information is an eNodeB; and
the receiver is configured to: when the terminal is in an idle mode on the LTE network, receive an RRC connection request message sent by the terminal, wherein the RRC connection request message comprises the ID of the terminal, the ID of the cell detected by the terminal, and the signal strength information of the cell detected by the terminal.

18. The device according to claim 16, wherein the signal strength information is reference signal received power (RSRP) information or reference signal received quality (RSRQ) information.

19. The device according to claim 11, wherein
the mobile communication network is a global system for mobile communications (GSM) network, and when the terminal is in a general packet radio service transfer (GPRS Transfer) mode on the GSM network, the device for collecting location information is a base station controller (BSC);
the transmitter is configured to send a measurement control message to the terminal by using the GSM network; and
the receiver is configured to receive a measurement report message from the terminal, wherein the measurement report message comprises the ID of the terminal, the ID of the cell detected by the terminal, and the signal strength information of the cell detected by the terminal.

20. The device according to claim 11, wherein
the mobile communication network is a GSM network, and the device for collecting location information is a base station controller (BSC); and
the receiver is configured to: when the terminal is in a general packet radio service packet idle (GPRS Packet Idle) mode on the GSM network, receive a connection request message from the terminal, wherein the connection request message comprises the ID of the terminal, the ID of the cell detected by the terminal, and the signal strength information of the cell detected by the terminal.

* * * * *